(12) United States Patent
Srinivasan

(10) Patent No.: US 8,676,180 B2
(45) Date of Patent: Mar. 18, 2014

(54) VIRTUAL SIM MONITORING MODE FOR MOBILE HANDSETS

(75) Inventor: Prasanna Srinivasan, TamilNadu (IN)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 12/511,893

(22) Filed: Jul. 29, 2009

(65) Prior Publication Data

US 2011/0028135 A1 Feb. 3, 2011

(51) Int. Cl.
*H04M 3/42* (2006.01)
*H04B 1/38* (2006.01)

(52) U.S. Cl.
USPC .................. 455/415; 455/558; 455/422.1

(58) Field of Classification Search
USPC ...................... 455/415, 558, 422.1
See application file for complete search history.

(56) References Cited

U.S. PATENT DOCUMENTS

| | | | |
|---|---|---|---|
| 5,428,666 A | 6/1995 | Fyfe et al. | |
| 5,763,862 A | 6/1998 | Jachimowicz et al. | |
| 5,987,325 A | 11/1999 | Tayloe | |
| 6,078,652 A | 6/2000 | Barak | |
| 6,212,372 B1 | 4/2001 | Julin | |
| 6,490,679 B1 | 12/2002 | Tumblin et al. | |
| 6,526,272 B1 | 2/2003 | Bansal et al. | |
| 6,643,504 B1 | 11/2003 | Chow et al. | |
| 6,829,593 B1 | 12/2004 | Ritter et al. | |
| 6,914,517 B2 | 7/2005 | Kinsella | |
| 7,039,221 B1 | 5/2006 | Tumey et al. | |
| 7,171,460 B2 | 1/2007 | Kalavade et al. | |
| 7,185,161 B2 | 2/2007 | Kang | |
| 7,218,930 B2 | 5/2007 | Ko et al. | |
| 7,593,605 B2 | 9/2009 | King et al. | |
| 7,676,222 B1 | 3/2010 | Helaine et al. | |
| 7,689,231 B2 * | 3/2010 | Mardiks et al. | ............ 455/456.4 |
| 7,689,251 B2 * | 3/2010 | Bae | ............................ 455/558 |
| 7,738,891 B2 | 6/2010 | Tenhunen et al. | |
| 7,787,602 B2 | 8/2010 | Pearson et al. | |
| 2001/0044900 A1 | 11/2001 | Uchida | |

(Continued)

FOREIGN PATENT DOCUMENTS

| | | |
|---|---|---|
| CN | 1482568 A | 3/2004 |
| DE | 29821644 | 2/1999 |

(Continued)

OTHER PUBLICATIONS

International Search Report and Written Opinion—PCT/US2010/043784, International Search Authority—European Patent Office—Feb. 16, 2011.

(Continued)

*Primary Examiner* — Ajit Patel
(74) *Attorney, Agent, or Firm* — James T. Hagler

(57) ABSTRACT

A system and methods that inform users of calls placed to a mobile device via a currently disabled VSIM subscription include identifying the VSIM subscription that is currently enabled on the mobile device and sending an alert to the mobile device via the currently enabled VSIM subscription informing the user of the received call attempt. In an embodiment, the user may switch the enabled VSIM subscription in order to receive the incoming call. If the user switches enabled VSIM subscriptions to the subscription corresponding to the dialed number, the caller's service provider network may be informed so that a communication can then be established between the caller and the mobile device.

74 Claims, 12 Drawing Sheets

(56) References Cited

U.S. PATENT DOCUMENTS

| | | |
|---|---|---|
| 2002/0072388 A1 | 6/2002 | Korneluk et al. |
| 2002/0095588 A1 | 7/2002 | Shigematsu et al. |
| 2002/0097855 A1 | 7/2002 | Neudeck et al. |
| 2002/0103964 A1 | 8/2002 | Igari |
| 2003/0046228 A1 | 3/2003 | Berney |
| 2003/0054800 A1 | 3/2003 | Miyashita |
| 2003/0083968 A1 | 5/2003 | Marsh et al. |
| 2003/0191939 A1 | 10/2003 | Tsai et al. |
| 2004/0022216 A1 | 2/2004 | Shi |
| 2004/0024670 A1 | 2/2004 | Valenzuela et al. |
| 2004/0039930 A1 | 2/2004 | Ohmori et al. |
| 2004/0050930 A1 | 3/2004 | Rowe |
| 2004/0087305 A1 | 5/2004 | Jiang et al. |
| 2004/0172541 A1 | 9/2004 | Ando et al. |
| 2004/0204051 A1 | 10/2004 | Scott et al. |
| 2004/0215968 A1 | 10/2004 | Rodwell et al. |
| 2004/0249915 A1 | 12/2004 | Russell |
| 2005/0020250 A1 | 1/2005 | Chaddha et al. |
| 2005/0039027 A1 | 2/2005 | Shapiro |
| 2005/0079863 A1 | 4/2005 | Macaluso |
| 2005/0101323 A1 | 5/2005 | De Beer |
| 2005/0124288 A1 | 6/2005 | Karmi et al. |
| 2005/0191998 A1 | 9/2005 | Onyon et al. |
| 2005/0193198 A1 | 9/2005 | Livowsky |
| 2005/0282554 A1 | 12/2005 | Shyy et al. |
| 2006/0068786 A1 | 3/2006 | Florence |
| 2006/0079237 A1 | 4/2006 | Liu et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0218337 A1 | 9/2006 | Hashimoto |
| 2006/0234693 A1 | 10/2006 | Isidore et al. |
| 2006/0282554 A1 | 12/2006 | Jiang et al. |
| 2006/0285538 A1 | 12/2006 | Oommen |
| 2006/0285663 A1 | 12/2006 | Rathus et al. |
| 2006/0291455 A1 | 12/2006 | Katz et al. |
| 2007/0060200 A1* | 3/2007 | Boris et al. .......... 455/558 |
| 2007/0094337 A1 | 4/2007 | Klassen et al. |
| 2007/0105531 A1 | 5/2007 | Schroeder |
| 2007/0130156 A1 | 6/2007 | U. Tenhunen et al. |
| 2007/0149170 A1 | 6/2007 | Bloebaum et al. |
| 2007/0178895 A1 | 8/2007 | Bot |
| 2007/0202895 A1 | 8/2007 | Benco et al. |
| 2007/0206838 A1 | 9/2007 | Fouquet |
| 2007/0218947 A1 | 9/2007 | Buckley |
| 2007/0223031 A1 | 9/2007 | Kitada et al. |
| 2007/0238449 A1 | 10/2007 | Park et al. |
| 2007/0254713 A1* | 11/2007 | Lagnado et al. .......... 455/558 |
| 2007/0255797 A1 | 11/2007 | Dunn et al. |
| 2008/0020755 A1 | 1/2008 | Liu et al. |
| 2008/0020773 A1 | 1/2008 | Black et al. |
| 2008/0028230 A1 | 1/2008 | Shatford |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0209545 A1 | 8/2008 | Asano |
| 2008/0223925 A1 | 9/2008 | Saito et al. |
| 2008/0254766 A1 | 10/2008 | Craven |
| 2008/0265024 A1 | 10/2008 | Tracy et al. |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0061839 A1 | 3/2009 | Zimmerman et al. |
| 2009/0077643 A1 | 3/2009 | Schmidt et al. |
| 2009/0108988 A1 | 4/2009 | Cleveland et al. |
| 2009/0163175 A1 | 6/2009 | Shi et al. |
| 2009/0191846 A1 | 7/2009 | Shi |
| 2009/0215449 A1 | 8/2009 | Avner |
| 2009/0227230 A1 | 9/2009 | Camilleri et al. |
| 2010/0005313 A1* | 1/2010 | Dai .......... 713/185 |
| 2010/0112997 A1 | 5/2010 | Roundtree |
| 2010/0167724 A1 | 7/2010 | Haran et al. |
| 2010/0234009 A1 | 9/2010 | Antani et al. |
| 2010/0248690 A1 | 9/2010 | Biggs et al. |
| 2010/0279653 A1 | 11/2010 | Poltorak |
| 2010/0291924 A1 | 11/2010 | Antrim et al. |
| 2010/0311391 A1 | 12/2010 | Siu et al. |
| 2010/0311402 A1 | 12/2010 | Srinivasan et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2010/0311468 A1 | 12/2010 | Shi et al. |
| 2011/0059738 A1 | 3/2011 | Waller |

FOREIGN PATENT DOCUMENTS

| | | |
|---|---|---|
| DE | 10146664 A1 | 2/2003 |
| EP | 1012716 A1 | 6/2000 |
| EP | 1337119 A1 | 8/2003 |
| EP | 1638357 A1 | 3/2006 |
| EP | 1696357 A1 | 8/2006 |
| EP | 1727383 A1 | 11/2006 |
| EP | 2076071 A1 | 7/2009 |
| GB | 2313257 A | 11/1997 |
| GB | 2386803 A | 9/2003 |
| JP | 4352548 A | 12/1992 |
| JP | H06284182 A | 10/1994 |
| JP | 3048638 B2 | 6/2000 |
| JP | 2000259820 A | 9/2000 |
| JP | 2002095038 A | 3/2002 |
| JP | 2002511968 A | 4/2002 |
| JP | 2002197186 A | 7/2002 |
| JP | 2002218536 A | 8/2002 |
| JP | 2002297257 A | 10/2002 |
| JP | 2002297552 A | 10/2002 |
| JP | 2003091509 A | 3/2003 |
| JP | 2003264631 | 9/2003 |
| JP | 2004134825 A | 4/2004 |
| JP | 2004178141 A | 6/2004 |
| JP | 2004206412 A | 7/2004 |
| JP | 2004220175 A | 8/2004 |
| JP | 2006054692 A | 2/2006 |
| JP | 2006114992 A | 4/2006 |
| JP | 2006121336 A | 5/2006 |
| JP | 2006211280 A | 8/2006 |
| JP | 2006295382 A | 10/2006 |
| JP | 2007200367 A | 8/2007 |
| JP | 2008518364 A | 5/2008 |
| JP | 2009514320 A | 4/2009 |
| JP | 2009542149 A | 11/2009 |
| KR | 20080021178 A | 3/2008 |
| KR | 20080100255 A | 11/2008 |
| RU | 2169437 C1 | 6/2001 |
| RU | 2300852 C2 | 6/2007 |
| WO | WO9219078 | 10/1992 |
| WO | WO9924938 | 5/1999 |
| WO | WO9946682 | 9/1999 |
| WO | WO0111577 | 2/2001 |
| WO | WO0162029 A1 | 8/2001 |
| WO | WO02067563 | 8/2002 |
| WO | WO03007639 A1 | 1/2003 |
| WO | WO03107112 A2 | 12/2003 |
| WO | WO2004028191 A1 | 4/2004 |
| WO | WO2005029890 | 3/2005 |
| WO | WO2006047764 A2 | 5/2006 |
| WO | WO2006094564 | 9/2006 |
| WO | WO2007049856 A1 | 5/2007 |
| WO | 2007092099 A1 | 8/2007 |
| WO | WO2007143342 | 12/2007 |
| WO | WO2008040964 | 4/2008 |
| WO | 2008093671 A1 | 8/2008 |

OTHER PUBLICATIONS

Partial International Search Report—PCT/US2010/043784—International Search Authority, European Patent Office, Nov. 9, 2010.

* cited by examiner

VIRTUAL SIM MONITORING MODE FOR MOBILE HANDSETS

RELATED APPLICATION DATA

This application is related to U.S. patent application Ser. No. 11/963,918, entitled "Virtual SIM card for Mobile Handsets" filed on Dec. 24, 2007; U.S. patent application Ser. No. 12/020,028, entitled "Biometric Smart Card for Mobile Devices" filed on Jan. 25, 2008; U.S. patent application Ser. No. 12/480,319, entitled "Virtual SIM card for Mobile Devices" filed on Jun. 8, 2009; U.S. patent application Ser. No. 12/480,406, entitled "Method and Apparatus for Switching Virtual SIM Service Contracts Based Upon a User Profile" filed on Jun. 8, 2009; U.S. patent application Ser. No. 12/480,453, entitled "Method and Apparatus for Updating the Rules Governing the Switching of a Virtual SIM Service Contract" filed on Jun. 8, 2009; and U.S. patent application Ser. No. 12/480,490, entitled "Method and Apparatus for Switching Virtual SIM Service Contracts when Roaming" filed on Jun. 8, 2009; the contents of each of which are hereby incorporated by reference in their entirety.

FIELD OF INVENTION

The present invention relates generally to cellular telephone technologies, and more particularly to a system and method for alerting a user that calls are being attempted to the user's mobile device over a currently disabled service provider subscription.

BACKGROUND OF INVENTION

Presently, mobile handsets utilize a variety of technologies and formats which may include, for example, GSM (Global System for Mobile Communication), CDMA (Code Division Multiple Access) and/or UMTS (Universal Mobile Telecommunications System) technology depending on the carrier of choice. Network provisioning data necessary to access cellular networks using GSM and UMTS technologies are stored on a Subscriber Identity Module (SIM), commonly known as a SIM card, which are plugged into mobile devices. Analogous devices for other mobile network systems have been developed, such as Removable User Identity Module (RUIM), Universal Subscriber Identity Module (USIM) or Universal Integrated Circuit Card (UICC). Collectively, these smart card devices are often referred to as smart cards or SIM cards.

The SIM card is a detachable memory module containing the user's cell phone provisioning or subscription information as well as personal data, such as phonebooks, saved SMS messages, downloaded data, etc. By storing such information on a SIM card, mobile device users can replace their mobile devices while keeping the same service provider subscription and retaining their personal data information simply by removing the SIM card from the old device and plugging it into the new one.

SUMMARY

Disclosed are communication systems, communication system components and methods for monitoring attempted call to a mobile device over currently disabled VSIM subscriptions (i.e., service provider subscriptions that are not currently loaded into the active VSIM memory buffer of the mobile device). In the various embodiments provisioning data supporting a plurality of VSIM subscriptions may be contained within an internal memory unit of a mobile device. The provisioning data for each of the plurality of service providers may be selectively retrieved and loaded for use by the mobile device. As the provisioning data for one VSIM subscription is retrieved and loaded into the active VSIM memory buffer on the mobile device for use, that VSIM subscription is enabled on the mobile device. In the case of mobile devices which may only support a single VSIM subscription at a time, any other service provider subscription for which provisioning data is stored within the internal memory unit (including a previously enabled VSIM subscription) will be disabled. Conventionally, a call placed to a disabled subscription will not be able to reach the mobile device and a user of the mobile device would be unaware of the failed call attempt. This disadvantage is overcome by enabling users to register any of their disabled VSIM subscriptions in a monitored mode status maintained by a remote server. Users may designate VSIM subscriptions for monitor mode status by transmitting a status report of each of the plurality of VSIM subscriptions to the remote server. This status report may contain information regarding which of the plurality of VSIM subscriptions is currently enabled (i.e., loaded into the active VSIM memory buffer), which of the plurality of VSIM subscriptions are disabled, and which of the plurality of disabled VSIM subscriptions should be in monitoring mode.

According to one embodiment, callers may attempt a call to a mobile device using a unique identifier (e.g., a telephone number assigned to a particular service provider subscription) associated with at least one of the plurality of VSIM subscriptions for which provisioning data is stored within an internal memory unit of the called mobile device. If the unique identifier used by the caller is associated with a currently disabled VSIM subscription, a remote server within the communication network may access a VSIM account to retrieve the status report of each of the plurality of VSIM subscriptions. Using the retrieved status report, the remote server may determine which of the plurality of VSIM subscriptions is currently enabled on the called mobile device along with the unique identifier associated with the currently enabled VSIM subscription. The remote server may generate and transmit an alert to the called mobile device using the unique identifier associated with the currently enabled VSIM subscription. The alert may contain information sufficient to inform a mobile device user of the call attempt, such as a unique identifier of the caller's communication device, the unique identifier of the currently disabled VSIM subscription over which the call attempt was made, the time that the call attempt was made, as well as the type of call attempt that was made (i.e., voice call, SMS, EMS, MMS, paging, etc.).

In another embodiment, the alert may be presented to the user in the form of a prompt asking whether the user would like to enable the VSIM subscription over which the call attempt was made. If the user elects to switch currently enabled VSIM subscriptions, the incoming call may be connected to and completed with the user's mobile device once the VSIM subscription change is effectuated.

BRIEF DESCRIPTION OF THE DRAWINGS

The accompanying drawings, which are incorporated herein and constitute part of this specification, illustrate embodiments of the invention, and, together with the general description given above and the detailed description given below, serve to explain features of the invention.

DETAILED DESCRIPTION

Figure 1:
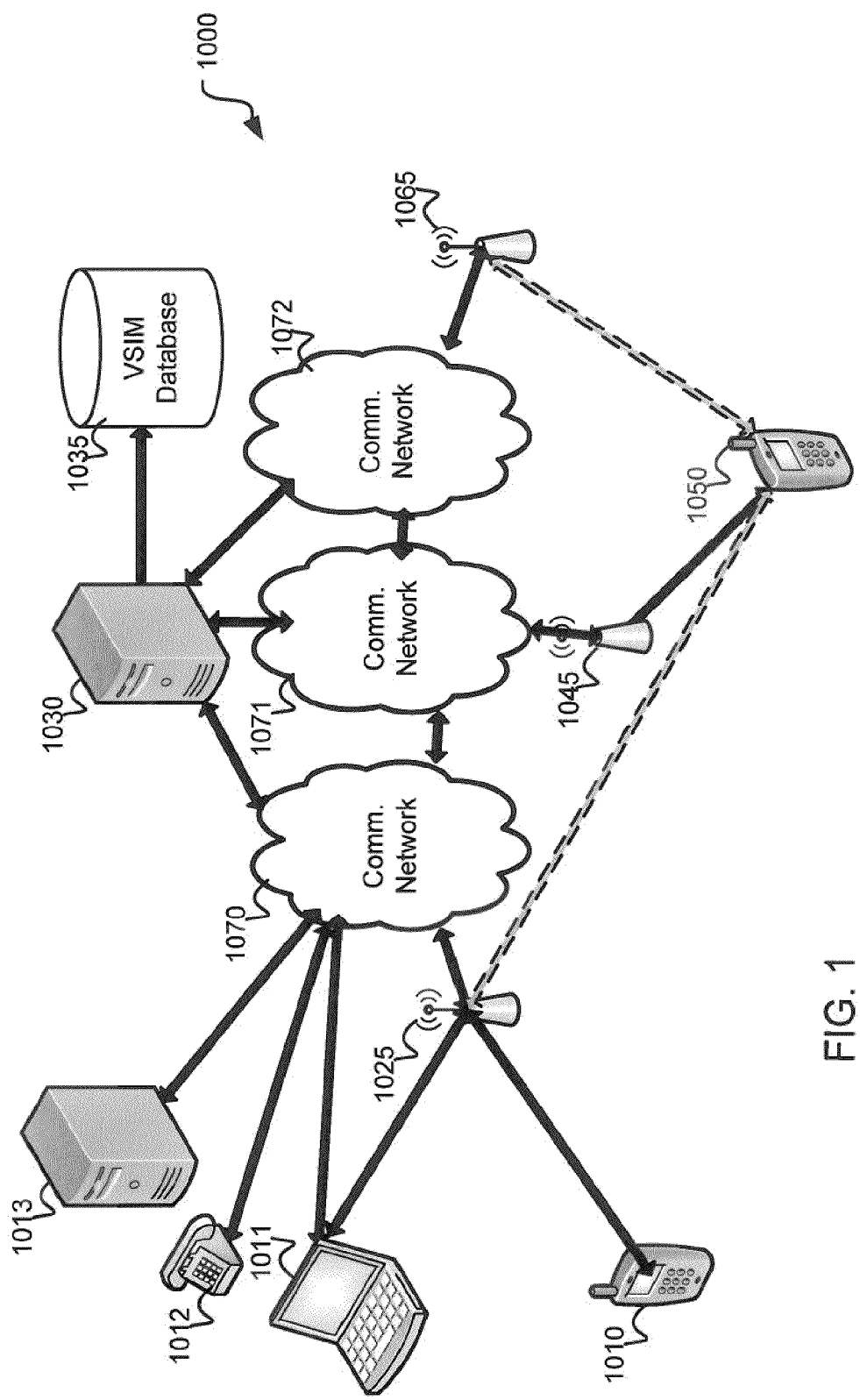
FIG. 1 is a communication system diagram illustrating an embodiment system enabling mobile devices to communicate with a plurality of virtual SIM (VSIM) service provider subscriptions

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms mobile device and communication device may refer to any one or all of cellular telephones, personal data assistants (PDA's), palm-top computers, laptop computers, wireless electronic mail receivers (e.g., the Blackberry® and Treo® devices), multimedia Internet enabled cellular telephones, and similar personal electronic devices which include a programmable processor and memory. Communication devices may further include stationary devices such as landline telephones and desktop computers. In a preferred embodiment, the mobile device and communication device are each cellular handsets that can communicate via a cellular telephone network (e.g., a cellphone).

As used herein, the term "server" refers to any of a variety of commercially available computer systems configured to operate in a client-server architecture. In particular, the term "server" refers to network servers, particularly Internet and/or intranet accessible servers, which typically include a processor, memory (e.g., hard disk memory), and network interface circuitry configured to connect the server processor to the network, such as the Internet or a cellular telephone network.

As used herein, the term "VSIM subscription" or "VSIM subscriptions" refers to a mobile service or subscription or account from any VSIM Service provider whose provisioning information may be maintained by a VSIM Server and/or VSIM Server database. A multiple or plurality of VSIM subscriptions may refer to multiple VSIM Subscriptions from a single or multiple VSIM Service provider whose provisioning information may be maintained by a VSIM Server and/or VSIM Server database.

In order to support communications over a wireless cellular network a mobile device must possess a service provider's provisioning data. The provisioning data allows the mobile device to recognize and be recognized by the service provider's communication network equipment (e.g., base stations, servers, etc.). Once recognized, the mobile device will be permitted to make and receive calls (i.e., voice, data, SMS, EMS, MMS, etc.) through the service provider's communication network. It should be noted that when attempting a call, the caller and the recipient may be supported by different service provider networks or the same service provider network. Reference to a service provider network may be the same service provider network or either of the caller's service provider network or the recipient's service provider network.

In some locations, multiple service providers may be operating communication networks to support communications. Each service provider may present different advantages and disadvantages associated with their service. For example, one service provider may provide better data transfer rates than all other service providers albeit at a higher cost, while other service providers may provide superior coverage across a geographic region resulting in a broader range in which calls may be made and received. Such broad coverage may also come at a higher cost. To benefit from the advantages offered by different cellular networks, some users may elect to maintain subscriptions with a multiple service providers. By doing so, users may elect to use one VSIM subscription over another to support mobile device communication as it suits their communication needs at a particular moment. Moreover, users may elect to maintain multiple subscriptions with the same service provider. For example, for accurate accounting purposes, users may elect to maintain a subscription with a particular service provider for business calls and another subscription with the same service provider for personal calls. When the user makes calls of one type or the other (i.e., business versus personal), the user may elect to enable the appropriate subscription. Each of the subscriptions may be treated independently as if each of the subscriptions is supported by different service providers.

Conventionally, a user may maintain multiple VSIM subscriptions by obtaining and using interchangeable SIM cards each containing the provisioning data to support communications over a particular service provider's communication network. By physically removing one SIM card from the user's mobile device and inserting another SIM card, a user can disable one VSIM subscription and enable another. For example, when users are outside a particular service provider's network they may plug in a SIM card containing provisioning data supporting communications on a communication network operating in the new location. Travel is not the only motivation for switching SIM cards. For example, a user may wish to utilize one service provider's communication network for data calls because it offers faster data transfer rates but a different service provider's communication network for voice calls because it offers voice service at a cheaper rate. Even when services and prices are identical a user may wish to use one VSIM subscription for business calls and another VSIM subscription for personal calls in order to maintain accurate accounting practices.

The conventional practice of switching out physical SIM cards to change service subscriptions has a number of disadvantages. Among them, the user must physically carry multiple SIM cards and interchange them to switch communication networks which may be a cumbersome process. In addition, if a SIM card is lost or stolen, any other user may insert the SIM card in their mobile device and proceed to fraudulently make calls using the VSIM subscription associated with the lost/stolen SIM card.

In order to provide mobile device users with increased flexibility and efficiency, virtual SIM cards have been proposed which allow users to maintain multiple VSIM subscriptions with all provisioning data maintained in memory and implement each VSIM subscription by activating a virtual SIM (VSIM) card. Instead of switching physical SIM cards as was previously done, the mobile device loads the provisioning data of a selected service provider network into transceiver's working memory (i.e., active memory buffer), thereby obviating the need to keep track of and carry multiple physical SIM cards. Beyond the advantages of convenience, VSIM subscriptions may be more secure since there is no physical SIM card that can be used to make fraudulent calls. Methods, systems and apparatus for implementing VSIM cards have been discussed in U.S. patent application Ser. No. 11/963,918, entitled "Virtual SIM card for Mobile Handsets" filed on Dec. 24, 2007; U.S. patent application Ser. No. 12/020,028, entitled "Biometric Smart Card for Mobile Devices" filed on Jan. 25, 2008; U.S. patent application Ser. No. 12/480,319, entitled "Virtual SIM card for Mobile Devices" filed on Jun. 8, 2009; U.S. patent application Ser. No. 12/480,406, entitled "Method and Apparatus for Switching Virtual SIM Service Contracts Based Upon a User Profile" filed on Jun. 8, 2009; U.S. patent application Ser. No. 12/480,453, entitled "Method and Apparatus for Updating the Rules Governing the Switching of a Virtual SIM Service Contract" filed on Jun. 8, 2009; and U.S. patent application Ser. No. 12/480,490, entitled "Method and Apparatus for Switching Virtual SIM Service Contracts when Roaming" filed on Jun. 8, 2009; which are incorporated by reference above and collectively are referred to as prior VSIM patent applications.

Typically, each VSIM subscription has a unique identifier associated with it such as a telephone number. Users may inform others of the unique identifier so that callers may contact the users' mobile device over the VSIM subscription. A mobile device user with multiple VSIM subscriptions may have multiple different unique identifiers (e.g., telephone number) even in the case where the multiple VSIM subscriptions are supported by the same service provider. Thus others may attempt to call the user by dialing one unique identifier while the user's mobile device has enabled a different VSIM subscription.

In both the case of conventional SIM card service provider subscriptions and VSIM subscriptions only one service provider subscription may be enabled on a mobile device at a time. Thus, when one VSIM subscription is enabled, all other VSIM subscriptions will be disabled. As a result, a call placed to a disabled VSIM subscription (i.e., dialed to the unique identifier associated with the disabled subscription) cannot be connected to the mobile device. Since the call attempt is on a disabled subscription, the user cannot be informed of the call attempt. Thus, this situation is unlike a call-waiting signal that may be received when a call is placed on an enabled subscription while the user is connected to a different call. As a result, users may miss important calls or messages when call attempts are made to the users' mobile device over a currently disabled VSIM subscription. Some conventional mobile devices may provide the ability to support more than one SIM cards (e.g., dual SIM slots) in such a way so as to allow the user to make and receive calls on a single device through more than one active subscription. Mobile devices with VSIM capabilities may be contemplated to allow a user to enable more than one VSIM subscriptions at a time. In such situations the mobile device may be said to have multiple subscription slots. Each subscription slot may enable a different service provider subscription (conventional SIM or VSIM) on the mobile device at the same time. Nevertheless, there may be instances where the user maintains more VSIM subscriptions than what the mobile device may concurrently enable For sake of simplicity, the embodiments are described herein as operating on a mobile device capable of supporting a single service provider subscription at a time. One of skill in the art would appreciate that the embodiments disclosed herein may be implemented by a mobile device that maintains more service provider subscriptions than can be concurrently enabled. An alert of the call attempt to one of the currently disabled VSIM subscription may be made to the user over any or all of the currently enabled VSIM subscription.

These disadvantages are addressed by the various embodiments which take advantage of VSIM subscriptions ability to monitor call attempts made to currently disabled VSIM subscriptions and alert users of such attempts with a message sent to the mobile device over its currently enabled VSIM subscription. For sake of simplicity, the various embodiments may be described with reference to a mobile device that may enable a single VSIM subscription at a time. One of skill in the art would appreciate that the embodiments disclosed herein may be implemented on devices that may enable more than one VSIM subscription at a time in order to monitor calls received on currently disabled VSIM subscriptions. In an embodiment, a mobile device may communicate with a remote VSIM server to inform the VSIM server of not only which VSIM subscriptions have been activated on the mobile device, but also which of those activated subscriptions is currently enabled. A VSIM subscription may be considered to be activated when a user purchases the subscription and downloads the provisioning data supporting the subscription to memory. The VSIM subscription may be considered enabled when the user loads the provisioning data supporting the subscription into the active memory buffer. As disclosed in the VSIM patent applications, a VSIM server may maintain a VSIM account for each mobile device it services. Alternatively, the VSIM server may maintain a database of all activated VSIM subscriptions correlated with the mobile device with which the VSIM subscription has been activated. In the various embodiments, the VSIM account may include a data record containing information regarding which VSIM subscriptions have been activated on the mobile device as well as personal user data. The various embodiments additionally store and update information regarding the currently enabled status of the VSIM subscriptions on the mobile device. This status information may include an indicator of the VSIM subscription that is currently enabled, indicators of the VSIM subscriptions that are currently disabled, and indicators of the currently disabled VSIM subscriptions which are to be placed in a monitoring mode. Inclusion of indicators of the VSIM subscriptions that are currently disabled within the status information is optional since knowledge of currently enabled VSIM subscription is sufficient to indicate the disabled subscriptions. Using this capability, mobile device users may inform the VSIM server of the disabled VSIM subscriptions they wish to be monitored for incoming calls. This status information identifying the currently enabled VSIM subscription and subscriptions to be monitored may be periodically transmitted to the VSIM server by the mobile device in the form of a status report. The VSIM server may receive such status reports and use them to update the VSIM subscription status information for the reporting mobile device.

When a caller attempts a call to a user's mobile device, the call attempt may not be connected (i.e., a communication link is not established) for a variety of reasons. One reason may be that the VSIM subscription associated with the unique identifier used to attempt the call is currently disabled on the user's mobile device. In order to determine whether this is the case, a data call communication may be sent to a VSIM server from the caller's telephone network or from the intended recipient's service provider network. This data call communication may contain information regarding the call attempt including the dialed unique identifier (e.g., telephone number). The VSIM server may receive the data call and use the unique identifier to locate and retrieve the VSIM account that contains the unique identifier. The retrieved VSIM account may contain information regarding the VSIM subscription associated with the unique identifier, as well as information regarding the VSIM subscription currently active on the mobile device that also subscribes to the VSIM subscription associated with the unique identifier, as well as the unique identifier associated with the currently active VSIM subscription. The retrieved VSIM account may also include the VSIM subscription status information as well as information regarding all other VSIM subscriptions associated with the mobile device. Using the information contained in the retrieved VSIM account the VSIM server may identify the VSIM subscription currently enabled on the mobile device. Also, the VSIM server may determine whether the user associated with the retrieved VSIM account has elected to be informed when call attempts are made on the VSIM service subscription over which the incoming call attempt is being made (i.e., whether the called VSIM subscription is in monitoring mode). If the VSIM subscription over which the incoming call attempt is being made is in monitoring mode, the VSIM server may generate and send an alert to the user using the unique identifier associated with VSIM subscription currently enabled on the mobile device. Such an alert may contain information sufficient to inform the user about the call attempt, such as the VSIM subscription over which the call was or is attempted, a unique identifier of the caller's communication device, and other information such as the time the call attempt was made. Such an alert, which may be communicated using a variety of different message formats (i.e., SMS, EMS, MMS, Push message, etc.), enables a user to promptly return the call or to switch to the dialed VSIM subscription so the user can receive future calls to the associated number.

In an embodiment, the alert may be transmitted promptly while the call attempt is placed in a busy-wait loop status while the user may be given the option of switching from the currently enabled VSIM subscription to the VSIM subscription with the incoming call attempt so that the user can accept the call. This embodiment enables the user to be informed of the call attempt and switch to the appropriate VSIM subscription so that the call may be completed, eliminating the need to return the call. The "busy wait loop" status may be used while the network tries to find/page the mobile number. The "busy wait loop" status may signify to the caller that the network is attempting to complete the call.

FIG. 1 is a communication system diagram illustrating an embodiment system 1000 which allows a user's mobile device to enable a plurality of virtual SIM (VSIM) subscriptions. In FIG. 1 a variety of different communication devices 1010, 1011, 1012, 1013 may be able to contact a user's mobile device 1050. As shown, the initiating communication devices may include, for example, a wireless communication device 1010 conducting communication via a base station 1025, a laptop computer 1011 communicating either through a hard wire connection to a gateway (not shown) to the communication network 1070 or via a wireless connection to a base station 1025, a landline communication device 1012, or a server 1013 using a hard wire connection to a gateway (not shown) to the communication network 1070. The communication network 1070 may comprise a number of communication equipment devices including, but not limited to servers which may be used to receive and route calls to and from the communication devices operating on the network. For simplicity, the discussion of the various embodiments herein will refer to the wireless communication devices 1010 as the caller's communication device. One of skill in the art would appreciate that any of a number of communication devices may be used to initiate a call attempt.

When a user enables a selected VSIM subscription on a mobile device 1050, the mobile device 1050 registers with the selected service provider's communication network and equipment (e.g., 1071, 1045). In this example, the user has VSIM subscriptions with each of the three illustrated communication networks 1070, 1071, 1072, and thus may communicate with any of the associated base stations 1025, 1045, 1065, depending on which VSIM subscription is currently enabled. As an example, the mobile device 1050 is shown currently registered with communication network 1071 and base station 1045. Possible connections with communication networks 1070 and 1072 (and corresponding base stations 1025 and 1065) are also shown. When a call is placed to the user's mobile device 1050, the caller enters a unique identifier associated with a VSIM subscription previously activated by the mobile device 1050. If the entered unique identifier is associated with the VSIM subscription that is currently enabled on the mobile device 1050, the caller's service provider network 1070 will be able to route the call to the currently enabled service provider's communication network 1071 and base station 1045 with which the user's mobile device 1050 is currently communicating.

However, if the entered unique identifier is associated with a VSIM subscription that is currently disabled on the mobile device 1050 (i.e., not the currently enabled VSIM subscription), then the caller's service provider network 1070 will not be able to route the call because the mobile device 1050 will not be registered with service provider's communication network (e.g., 1070 or 1072) associated with the unique identifier. Similarly, if the user maintains multiple VSIM subscriptions with the same service provider then the caller's service provider network 1070 will not be able to route the call because the mobile device 1050 will not be registered with service provider's communication network using the provisioning information identified by the unique identifier that the caller is using in the call attempt. In the various embodiments, when a call attempt is not connected, the caller's service provider network 1070 may transmit a data communication call to a VSIM server 1030. This data communication call may inform the VSIM server that a call attempt is being made to the entered unique identifier (e.g., phone number assigned to mobile device for a particular VSIM subscription) from the caller's communication device 1010. The VSIM server 1030 use the received unique identifier to access a VSIM database 1035 to obtain a VSIM account associated with or containing the dialed number. Using information retrieved from the VSIM database 1035 the VSIM server 1030 may generate and transmit an alert to the user's mobile device 1050 via the communication network 1071 and base station 1045 with which the mobile device is currently registered.

The VSIM server 1030 may also be in communication with the communication network (e.g., 1072) associated with the disabled VSIM subscription. Thus, when a user switches VSIM subscriptions the communication network associated with the newly enabled VSIM subscription (e.g., 1070 or 1072) may begin communicating with the mobile device 1050.

Figure 2:
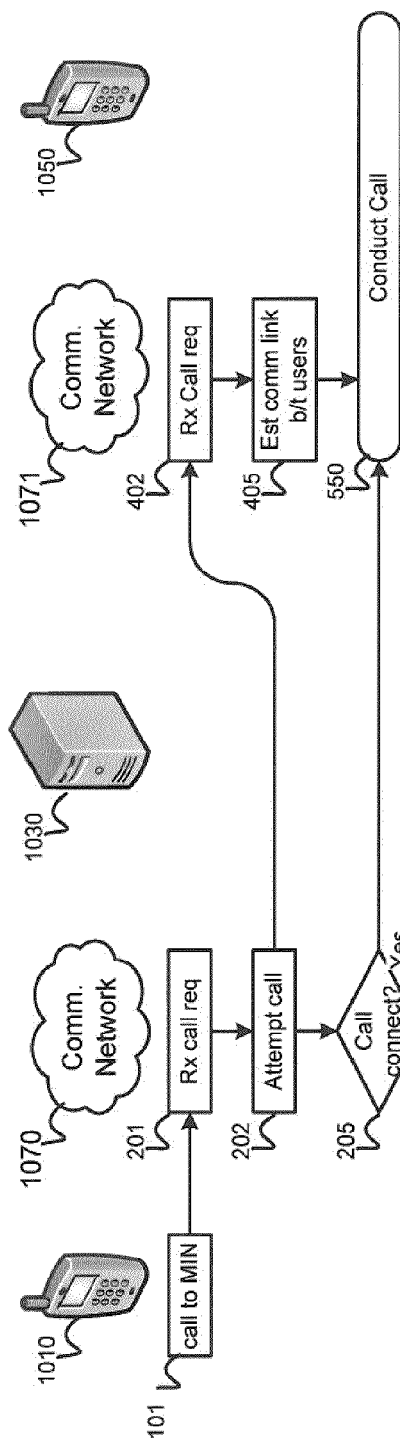
FIG. 2 is a process flow diagram of an embodiment method for providing an alert to a user's mobile device that a call attempt has been made to a currently disabled VSIM service provider subscriptions
Figure 2:
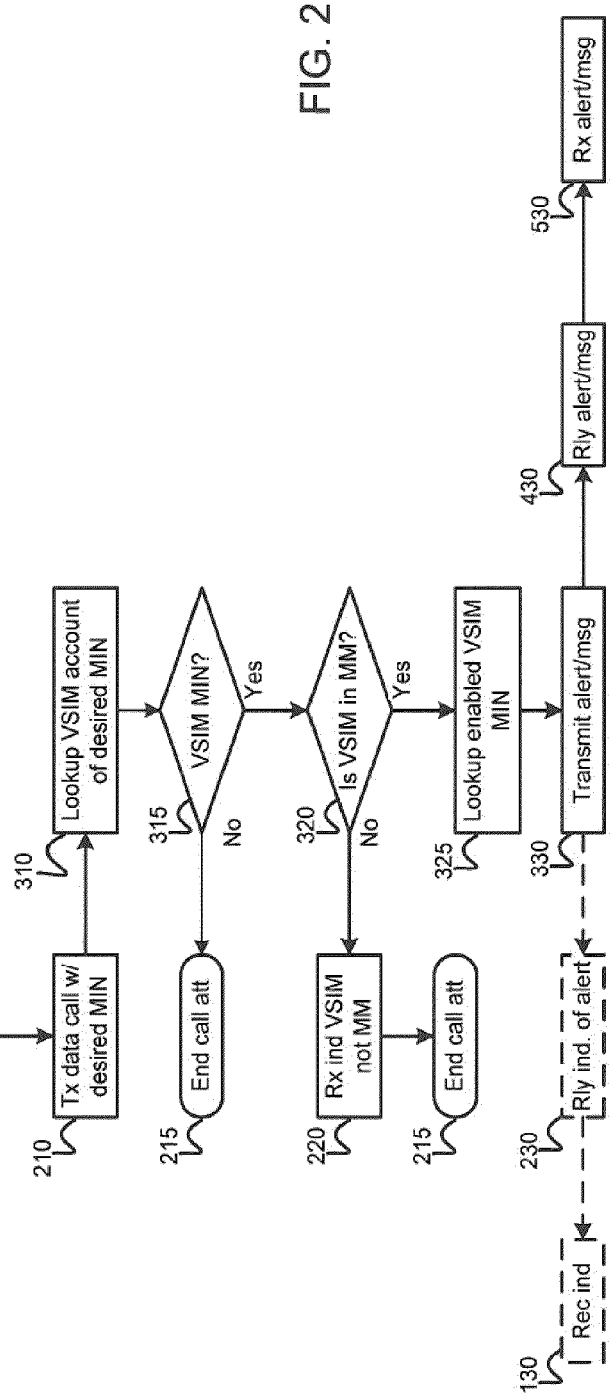

FIG. 2 is a process flow diagram of an embodiment method for providing an alert to a user's mobile device that a call attempt has been made to a currently disabled VSIM subscription. When a caller initiates a call (e.g., voice, data, SMS, MMS, etc.) to a user's mobile device 1050, the caller enters a unique identifier associated with a VSIM subscription (referred to as the desired VSIM subscription) on the caller's communication device 1010, step 101. The call request is received by the caller's service provider network 1070, step 201. Upon receipt, the caller's service provider network 1070 may attempt to route the call to the user's mobile device 1050 via the service provider network associated with the entered unique identifier, step 202.

When a caller attempts a call request to the user's mobile device 1050 using a unique identifier associated with the VSIM subscription currently enabled on the user's mobile device 1050, the call request is received by the caller's communication network 1070. Routers and servers within the caller's communication network 1070 utilize the entered unique identifier to lookup the communication network (e.g., 1071) associated with the entered unique identifier and supporting communications for the currently enabled VSIM subscription. For sake of simplicity the communication network associated with the entered unique identifier and the currently enabled VSIM subscription may be referred to as the user's communication network. It should be noted that while FIG. 1 depicts the user's communication network (e.g., 1071) to be a different communication network from the caller's communication network 1070, they may also be the same network. Once the user's communication network (i.e., communication network 1071) is identified, the caller's network 1070 establishes a communication session with the user's communication network to determine the location of the mobile device 1050 or at least the base station (e.g., 1045) with which the mobile device 1050 has registered. Once this location is determined, the communication link between the caller's communication device 1010 and user's mobile device 1050 may be established.

When a mobile device 1050 enables a particular VSIM subscription, the mobile device 1050 registers itself with the communication network (i.e., user's communication network 1071) and the equipment supporting the communication network (e.g., base station 1045). By doing so the user's communication network 1071 is made aware of the mobile device's 1050 presence. Consequently, when a caller enters a unique identifier that is associated with the user's communication network (i.e., communication network 1071), the caller's communication network 1070 may contact the user's communication network with information regarding the call request to the mobile device 1050. The user's communication network locates the mobile device 1050 (i.e., retrieves which base station 1045 the mobile device 1050 is registered with via a home location register database) and establishes a communication link between the caller's communication device 1010 and the mobile device 1050. Once this link is established, the call between devices may commence.

However, when the user disables a particular VSIM subscription the provisioning data allowing the mobile device 1050 to communicate and register with the user's communication network is deleted from the active VSIM memory buffer of the mobile device 1050. For example, suppose the user disables the VSIM subscription which supports communications on communication network 1072 and enables the VSIM subscription which supports communications on communication network 1071. Thus, communications network 1071 becomes the user's primary communication network. Without the provisioning data supporting communications on communication network 1072, the mobile device 1050 will no longer be able to register itself with any equipment associated with communication network 1072. Consequently, calls made using the unique identifier associated with the user's subscription supporting calls on communication network 1072 will not be connected to the mobile device 1050. A similar result occurs when the user's mobile device 1050 is powered off or out of range of the user's communication network (i.e., 1072) or in the case of a conventional mobile device, when the physical SIM/RUIM card is removed from the mobile device.

Thus, when a caller attempts a call request to the user's mobile device 1050 using a unique identifier associated with a VSIM subscription currently disabled on the user's mobile device 1050, the call request is again received by the caller's communication network 1070. Routers and servers within the caller's communication network 1070 utilize the entered unique identifier to lookup the communication network 1072 associated with the entered unique identifier and supporting communications for the currently disabled VSIM subscription. For sake of simplicity the communication network 1072 associated with the entered unique identifier and the currently disabled VSIM subscription may be referred to as the user's secondary communication network. It should be noted that while FIG. 1 depicts the user's secondary communication network (e.g., 1072) to be a different communication network as the caller's communication network 1070, they may also be the same network. Once the user's secondary communication network (i.e., communication network 1072) is identified, the caller's network 1070 establishes a communication session with the user's secondary communication network to determine the location of the mobile device 1050 or at least the base station (e.g., 1065) with which the mobile device 1050 may be registered. Since the mobile device 1050 has currently disabled the VSIM subscription associated with the user's secondary communication network 1072, the mobile device 1050 will not be located by the user's secondary communication network 1072. Consequently, no communication link between the caller's communication device 1010 and user's mobile device 1050 will be established.

As discussed above with reference to FIGS. 1 and 2, if the entered unique identifier is associated with a VSIM subscription that is currently enabled on the mobile device 1050 (e.g., communication network 1071), the call will be routed via the caller's communication network 1070 through to the communication network 1071 and to the mobile device 1050, step 402. Upon receipt, servers operating within communication network 1070 and 1071 will establish a communication link between the caller's communication device 1010 and the user's mobile device 1050, step 405. Once the communication link is established, the call may be conducted, step 550.

After attempting to connect the call (step 202), the communication network 1070 supporting the caller's service provider subscription may await some period of time and then determine if the call was properly connected, determination 205. If the call is properly connected (i.e., determination 205=Yes), then the call is simply allowed to continue (i.e., step 550).

However, if the entered unique identifier is associated with a currently disabled VSIM subscription, no call will be connected. Thus, if the caller's service provider network 1070 determines that the call was not connected (i.e., determination 205=No), then the caller's service provider network 1070 may prepare and transmit a data communication call message to a VSIM server 1030 indicating the entered unique identifier (i.e., desired MIN), step 210. The data communication call may further indicate the unique identifier of the caller's communication device 1010. The VSIM server 1030 may use the unique identifier contained in the data call communication as a look up value to locate and retrieve the VSIM account that contains the unique identifier, step 310. From the results of this database look up the VSIM server 1030 may determine whether the unique identifier is associated with a VSIM subscription, determination 315. For example, if the database look up does not return a VSIM account, this may indicate that the unique identifier is not associated with a VSIM subscription, such as may be that the case when the unique identifier is associated with a conventional service provider subscription. Accordingly, if the VSIM server 1030 determines that the entered unique identifier is not associated with a VSIM subscription (i.e., determination 315=No), such a finding may be transmitted back to the caller's communication network 1070 and the caller's communication network 1070 may end the call attempt, step 215.

However, if the VSIM server 1030 determines that the entered unique identifier is associated with a VSIM subscription (i.e., determination 315=Yes), the VSIM server 1030 may determine whether the VSIM subscription associated with the unique identifier has been placed in monitor mode, determination 320.

The retrieved VSIM account may include information regarding the mobile device associated with the VSIM subscription, which of the plurality of VSIM subscriptions is enabled on the mobile device, which of the plurality of user's VSIM subscriptions are disabled, and which of the plurality of disabled VSIM subscriptions are in monitoring mode.

When a user elects to enable one VSIM subscription the user may optionally place the disabled VSIM subscription in a monitored mode. By placing a disabled VSIM subscription in monitor mode, the user indicates to the VSIM server that it should generate and transmit an alert to the user via the currently enabled VSIM subscription when a call attempt is made via the monitored (disabled) VSIM subscription.

A user may send messages (such as an updated status report) to the VSIM server to place a disabled VSIM subscription in monitored mode status or remove a disabled VSIM subscription from monitored mode status at any time. For example, in instances where the user does not wish to be disturbed, the user may elect to remove all disabled VSIM subscriptions from monitor mode status. Consequently, the user will not receive any alert when a call is attempted to a disabled VSIM subscription. Alternatively, if the user is expecting a call via a particular VSIM subscription, the user may place that particular VSIM subscription in monitor mode. As a result, the user may be alerted when a call is attempted via the particular VSIM subscription even if the particular VSIM subscription is currently disabled. In an embodiment, each time a VSIM subscription is disabled the subscription may be automatically placed in monitoring mode unless the user indicates otherwise. In this manner, an alert may be generated and sent each time a call attempt to a disabled VSIM subscription is received.

The VSIM server 1030 may determine if the desired VSIM subscription associated with the unique identifier in the received data call communication has been placed in monitor mode by the user by retrieving the VSIM account containing the desired VSIM subscription and accessing the status of the various VSIM subscriptions contained in the VSIM account, determination 320. If the desired VSIM subscription has not been placed in monitor mode (i.e., determination 320=No), then the VSIM server 1030 may send an indication back to the caller's communication network 1070 indicating that the desired VSIM subscription is not available, step 220. Upon receipt of this indication, the caller's communication network 1070 may end the call attempt, step 215.

If the incoming call is to a unique identifier corresponding to a VSIM subscription that is determined to be in monitor mode (i.e., determination 320=Yes), then the VSIM server 1030 may determine from the retrieved VSIM account information the VSIM subscription that is currently enabled on the user's mobile device 1050, step 325. The VSIM server 1030 may then generate an alert message and transmit the alert message to the user's mobile device 1050 via the currently enabled service provider communication network 1071, step 330. The currently enabled service provider communication network 1071 may relay the alert message to the user's mobile device 1050, step 430. The alert message may be received by the user's mobile device 1050, step 530. The alert message may contain information such as the dialed number or the desired VSIM subscription to which the call attempt was made, the unique identifier of the caller's communication device 1010, and optionally the time of the call attempt if there is a delay in transmitting the alert message or the type of call that was attempted (i.e., voice call, SMS/EMS/MMS, paging, etc.). The alert message may be generated and transmitted in a variety of protocols. For example, the alert may be generated as an SMS message, multimedia message service (MMS) message, electronic message service (EMS) message, an email, or some other similar message service. Once received, the user may, for example, use the information contained in the alert to contact the caller using the currently enabled VSIM subscription. In the event, the user has disabled all VSIM subscriptions without enabling a VSIM subscription, the VSIM server 1030 may not be able to determine from the retrieved VSIM account information the VSIM subscription that is currently enabled on the user's mobile device 1050, step 325. In such an instance, the VSIM server 1030 may send an indication back to the caller's communication network 1070 indicating that the desired VSIM subscription is not available. Upon receipt of this indication, the caller's communication network 1070 may end the call attempt, step 215.

Optionally, when the VSIM server 1030 generates and transmits the alert message, the alert or another message may also be transmitted back to the caller's communication device 1010. This may be accomplished to provide the caller with an indication that an alert was sent to the user. This message may be transmitted to the caller's service provider network 1070, step 330, for relay back to the caller's communication device 1010, step 230. This message may be received by the caller's communication device 1010, step 130. Upon receipt, the caller may elect to terminate the call attempt.

Figure 3:
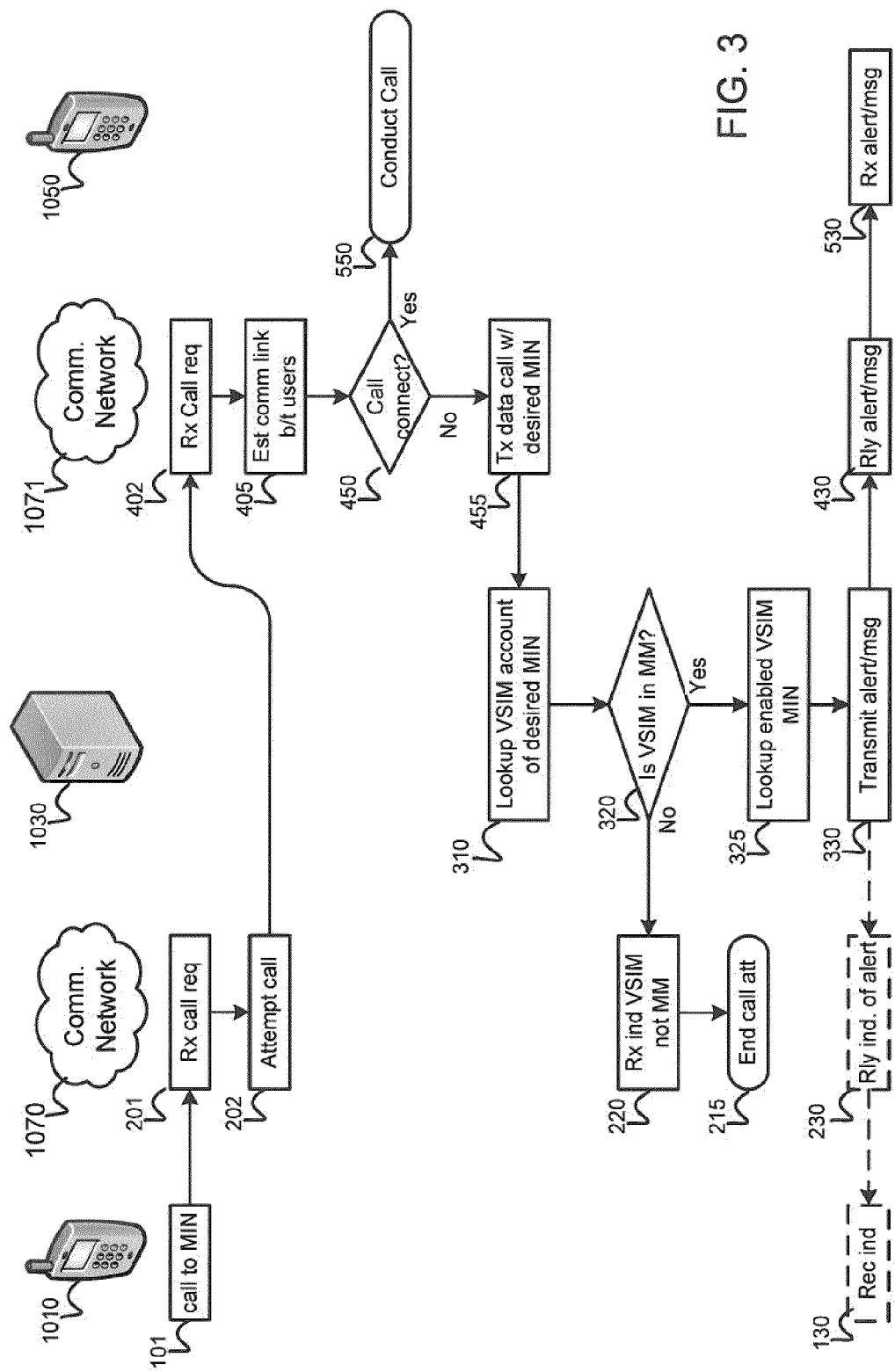
FIG. 3 is a process flow diagram of an alternative embodiment method for providing an alert to a user's mobile device that a call attempt has been made to a currently disabled VSIM service provider subscription.

FIG. 3 is a process flow diagram of an alternative embodiment method for providing an alert to a user's mobile device that a call attempt has been made to a currently disabled VSIM subscription. The alternative embodiment process flow illustrated in FIG. 3 is similar to the process flow illustrated in FIG. 2. However, in the alternative embodiment, when a caller attempts to contact a user via a disabled VSIM subscription, the user's communication network 1071 supporting the disabled VSIM subscription may initiate the data communication call to the VSIM server 1030 in order to alert the user of the call attempt over the currently disabled VSIM subscription. In some instances the caller's communication network 1070 may not be aware of VSIM subscription services and thus may not be aware of or able to contact a VSIM server 1030. Because the user's various communication networks may obtain provisioning information through a VSIM server 1030, the user's communication networks may be aware of and capable of contacting the VSIM server 1030.

As discussed above with reference to FIG. 2, a caller initiates a call attempt to a user using the unique identifier associated with a currently disabled VSIM subscription, step 101. The call request is received by the caller's network 1070 (step 201) and a connection is made with the communication network 1071 supporting the VSIM subscription associated with the unique identifier (steps 202, 402 and 405). In the alternative embodiment illustrated in FIG. 3, as opposed to the caller's communication network 1070, the user's secondary communication network 1071 supporting the VSIM subscription associated with the unique identifier may determine if the call can be connected, determination 450. Similar to determination 205 discussed above with reference to FIG. 2, if the call is properly connected (i.e., determination 450=Yes), then the call is simply allowed to continue (i.e., step 550).

However, if the entered unique identifier is associated with a currently disabled VSIM subscription, no call will be connected. Thus, if the user's secondary service provider network 1071 determines that the call was not connected (i.e., determination 450=No), then the user's service provider network 1071 may prepare and transmit a data communication call message to a VSIM server 1030 indicating the entered unique identifier (i.e., desired MIN), step 455.

In contrast to the process flow illustrated in FIG. 2, in an alternative embodiment where the user's secondary communication network initiates the data communication call, the step of determining whether the unique identifier is associated with a VSIM subscription (i.e., determination 315) shown in FIG. 2 may be omitted. For example, since each of the user's communication networks would necessarily provide VSIM subscriptions, any of the user's communication networks could confirm that the entered unique identifier is associated with a VSIM subscription. Each of the user's communication networks may support both conventional subscriptions as well as VSIM subscriptions. In order to distinguish a call made to a conventional subscription (i.e., one supported by a SIM card and not capable of being in monitor mode) and a call made to a VSIM subscription, the user's communication network may assign unique identifiers (MINs) within a particular range if the unique identifier is associated with a VSIM subscription. In this manner, the user's communication network may quickly determine whether the call is being made to a VSIM subscription. Thus, upon receipt of the data communication call from any of the user's communication networks, the VSIM server 1030 may retrieve the appropriate VSIM account associated with the unique identifier (step 310) and continue to determine whether the desired VSIM subscription is in monitor mode, determination 320 in the same manner as discussed above with reference to FIG. 2.

In an embodiment, the user may enable the VSIM subscription associated with the entered unique identifier after the initial call attempt was made (step 202). Due to latency issues, the VSIM subscription associated with the entered unique identifier may be enabled and the status report indicating this update may be reported back to the VSIM server 1030 while the data call communication is being attempted. In such a scenario, the VSIM server 1030 may determine from the retrieved VSIM account information that the VSIM subscription that is currently enabled on the user's mobile device 1050 now matches the desired VSIM subscription. If upon retrieving the VSIM account information the VSIM server 1030 determines that the currently enabled VSIM subscription matches the desired VSIM subscription, the VSIM server 1030 may instruct the caller's communication network 1070 to re-attempt the call (step 202). For sake of simplicity various embodiments may be described by having the caller's communication network initiating contact with a VSIM server when a call to a user's communication device over a disabled VSIM subscription is attempted. One of skill in the art would appreciate that communications with the VSIM server 1030 may be initiated by either the caller's communication network or any of the user's communication networks.

In embodiments in which each VSIM subscription is automatically placed in monitor mode when the VSIM subscription is disabled (i.e., the user cannot opt out or disable the monitoring mode), the step of determining whether the VSIM subscription is in monitoring mode (i.e., step 320) may be omitted. In such an alternative embodiment, when the VSIM account is retrieved, the currently enabled VSIM subscription may be identified and an alert may be automatically sent by the VSIM server (steps 325 and 330).

Figure 4:
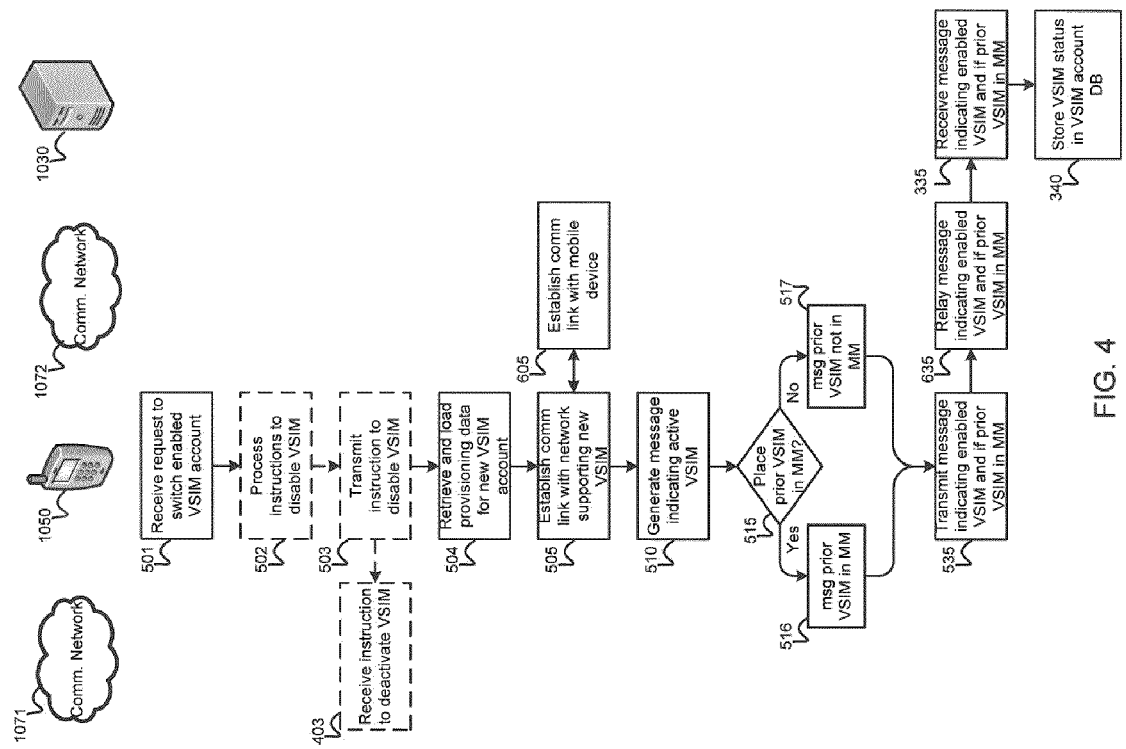
FIG. 4 is a process flow diagram of an embodiment method for switching currently enabled VSIM service provider subscriptions and communicating a status of VSIM service provider subscriptions to a remote VSIM server.

FIG. 4 is a process flow diagram of an embodiment method for switching currently enabled VSIM subscriptions and communicating a status of VSIM subscriptions to a remote VSIM server. When a user elects to enable a different VSIM subscription on the mobile device 1050, the mobile device 1050 processor may receive the user's request to switch currently enabled VSIM subscriptions, such as in the form of a menu option selection, step 501. The request to switch VSIM subscriptions may be initiated by a user. The request may also be generated by the mobile device itself, as in the case of an intelligent application which automatically switches VSIM subscriptions to enable the most cost effective subscription that will provide the highest quality of service in a given location. The request may further be generated by the VSIM server. In response the mobile device 1050 processor may process instructions to delete the provisioning data for the currently enabled VSIM subscription from the active VSIM memory buffer, thus disabling the VSIM, step 502. Deleting the provisioning data from the active VSIM memory buffer is similar to removing a SIM card from the mobile device as the wireless transceiver no longer can transmit the mobile device identifiers that enable it to connect to the disabled service provider's network. Thus, in the example illustrated in FIG. 1, when the user elects to delete the provisioning data associated with communication network 1071 (i.e., currently enabled VSIM subscription) from the VSIM memory buffer, the mobile device 1050 will no longer be able to make and receive calls from communication network 1071.

Prior to deletion, the mobile device 1050 processor may further optionally transmit a notice to the currently enabled VSIM subscription communication network 1071 informing that network that the mobile device 1050 is disabling its link to the network 1071, step 503. This notice may be optionally received by the communication network 1071 which may take actions to smoothly terminate the communication link between the mobile device 1050 and the communication network 1071, step 403. For example, upon notification from the mobile device to disable the VSIM subscription supporting communications on communication network 1071, the home location registry (not shown) which is responsible for maintaining which base station the mobile device 1050 is registered could affirmatively note the disabled status. Thus, when a caller's communication network 1070 establishes a communication sessions with communication network 1071 it could be immediately notified of the user's subscription status.

As is discussed in more detail below, the user may be provided with the choice to place a disabled VSIM subscription in monitor mode. By placing the disabled subscription in monitor mode, the user may be provided with an alert that a call attempt is being made to a disabled VSIM subscription. In order to trigger the process resulting in an alert sent to the user, the caller's communication network 1070 (or user's communication network 1071) may first determine that a connection to the user's mobile device 1050 is not possible. When a user disables a particular VSIM subscription, the mobile device 1050 will not register with the user's communication network (i.e., 1071) until the subscription is subsequently enabled again and the mobile device is powered on and within range of the communication network 1071. Consequently, calls to mobile device 1050 via the disabled VSIM subscription will not be connected. This is similar to the situation where the mobile device 1050 is powered off or out of range of the user's communication network. Voice calls to a mobile device that is powered off or out of range of the user's communication network are typically forwarded to a voice mail server. When the user's communication network interrogates the home location registry and discovers that the mobile device is not currently registered to any base station, the user's communication network typically forwards the call request to a voice mail server. Various embodiments may attempt to determine if a different VSIM subscription is enabled on the user's mobile device 1050 and send the user an alert of the call attempt prior to any attempt to forward the call to a voice mail server. If the VSIM subscription is determined to not be in monitor mode (i.e., FIGS. 2 and 3, determination 320=No), then the voice call may be forwarded to a voice mail server. Alternatively, in other embodiments such as the embodiment described below with reference to FIGS. 7*a*, 7*b*, 8, and 9, the voice call may be forwarded to a voice mail server in the event a recipient does not elect to switch enabled VSIMs. In other embodiments, the voice mail feature associated with a VSIM subscription may be disabled when the user elects to disable the VSIM subscription and place the VSIM subscription in monitor mode.

The mobile device 1050 processor may also retrieve from memory the provisioning data for the VSIM subscription that has been selected to be enabled and store this provisioning data in the active VSIM memory buffer, step 504. As discussed in the prior VSIM patent applications, the provisioning data for each of the activated VSIM subscription may be stored in an internal memory unit local to the mobile device 1050 as well as in the user's VSIM account stored in the VSIM server 1030 or associated VSIM server database 1035. When a particular VSIM subscription is enabled, the provisioning data for the selected VSIM subscription may be retrieved and stored in the active VSIM memory buffer. This active VSIM memory buffer is accessed by the wireless transceiver to obtain mobile device identifiers, network frequencies, and other information needed to establish the wireless communication link with the selected service provider's network. Thus, loading provisioning data into the active VSIM memory buffer is similar to plugging a SIM card into the mobile device.

Once the provisioning data for the newly enabled VSIM subscription has been retrieved and loaded in the active VSIM memory buffer, the mobile device 1050 may attempt to establish a wireless communication link with the communication network (e.g., 1072) of the newly enabled VSIM subscription, steps 505 and 605. When a communication link with the newly enabled VSIM service provider network 1072 has been established, the mobile device 1050 processor may generate a display indicating to the user that the selected VSIM subscription has been enabled on the mobile device 1050, step 510. The mobile device 1050 processor may further present a display prompting the user to indicate whether the previously enabled VSIM subscription being disabled should be placed in monitor mode, determination 515. As previously discussed, in an alternative embodiment, the VSIM subscription may be automatically placed in monitor mode whenever the VSIM subscription is disabled. In such an embodiment, step 515-517 may be omitted. If the user elects to place the VSIM subscription being disabled in monitor mode (i.e., determination 515=Yes), the mobile device 1050 processor may add an indication to the message generated in step 510 indicating that the disabled VSIM subscription should be placed in monitor mode, step 516. If the user elects to not place the disabled (previously enabled) VSIM subscription in monitor mode (i.e., determination 515=No), then the mobile device 1050 processor may add an indication to the message generated in step 510 indicating that the disabled (previously enabled) VSIM subscription should not be placed in monitor mode, step 517. The message generated in steps 510, 516 and 517 may be in the form of a status report that indicates the status of some or all VSIM subscriptions, including an indication of the currently enabled subscription and indicators of all disabled subscriptions that should be in monitoring mode. One of skill in the art would appreciate that additional messages may be generated or appended if the user elects to place additional disabled VSIM subscriptions in monitor mode or remove additional disabled VSIM subscriptions from monitor mode.

The mobile device 1050 may transmit the message indicating the current VSIM subscription status to the VSIM server 1030 over the communication network 1072 of the newly enabled (previously disabled) VSIM subscription, step 535. The message may be relayed by the service provider communication network to the VSIM server 1030, step 635, which may receive the message, step 335. The VSIM server 1030 may store the latest VSIM subscriptions status and update the user's VSIM account stored in the VSIM server's local memory or in a VSIM database 1035, step 340.

The process flow illustrated in FIG. 4 is for illustrative purposes, and any number of different messages may be sent to the VSIM server in a variety of sequences to keep the VSIM server informed of the mobile device's VSIM subscription status. For example, in an alternative embodiment, after receiving the user's request to switch enabled VSIM subscriptions, the mobile device 1050 processor may generate a status report indicating which VSIM subscription is about to be enabled and which VSIM subscriptions should be placed in monitor mode. This status report may be transmitted to the VSIM server 1030 via communication network 1071 prior to the deletion from the active VSIM memory buffer of the provisioning data supporting communications over network 1071.

Figure 5:
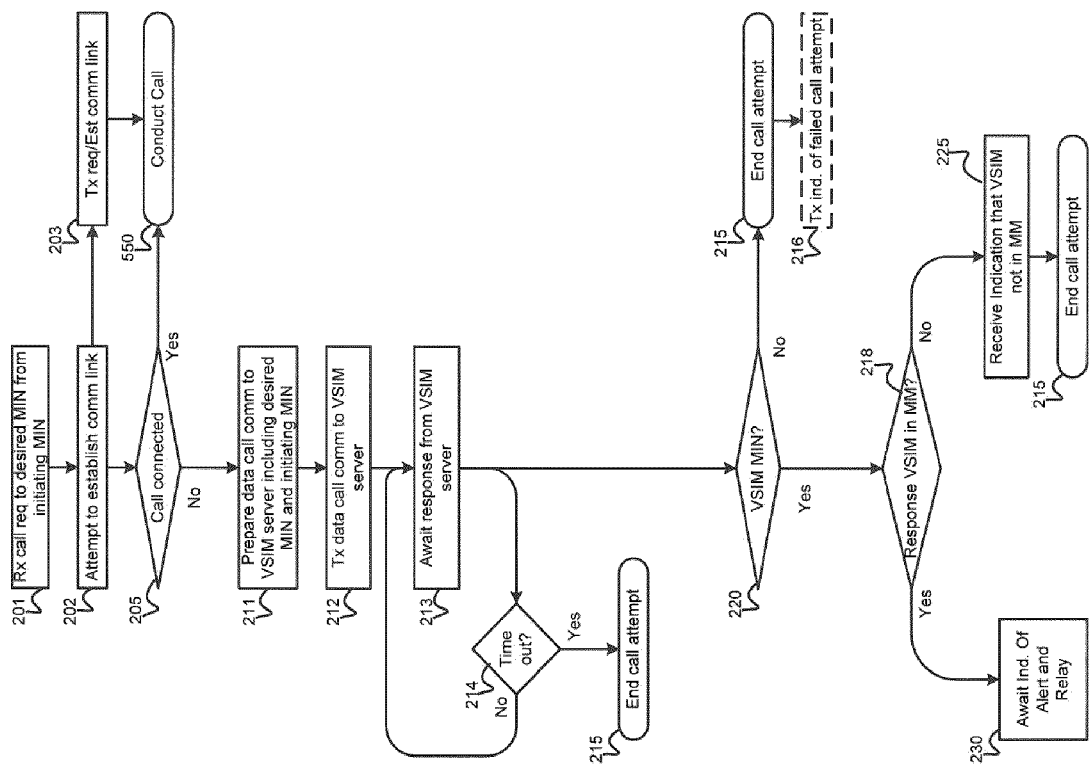
FIG. 5 is a process flow diagram of an embodiment method for handling a call attempt by the caller's gateway server to a user's mobile device.

FIG. 5 is a process flow diagram of an embodiment method for handling a call attempt by the caller's communication network 1070 to a user's mobile device 1050. The steps are described herein as being performed by the caller's communication network. However, it should be noted that the process flow illustrated in FIG. 5 may also be performed by the recipient's communication network upon receipt of a call attempt from the caller's communication network. In many cases, the caller's communication network may be the recipient's communication network. In the various embodiments described herein, various process flows are described as being performed by the caller's communication network or the recipient's communication network. One of skill in the art would appreciate that each of these embodiment methods may be performed by either the communication network.

When a caller initiates a call attempt to the user's mobile device 1050, the caller's service provider communication network 1070 attempts to establish an end-to-end communication link between the caller's communication device 1010 and the user's mobile device 1050. In order to initiate a call, the caller enters the unique identifier (MIN, telephone number, etc.) associated with at least one of the user's VSIM subscriptions and initiates the call (such as by depressing the 'send' key). The sender's communication device 1010 transmits the call request and entered unique identifier to the caller's service provider communication network 1070. The call attempt request is received by the caller's service provider communication network 1070, step 201, and based on the information contained in the call request (e.g., unique identifier) the caller's service provider communication network 1070 attempts to establish an end-to-end communication link with the user's mobile device 1050 over the communication network associated with the inputted unique identifier, step 202. Referring to FIG. 2, if the user's mobile device 1050 has enabled the VSIM subscription associated with the entered unique identifier, a communication link may be established and the call may commence, steps 203 and 550. After predetermined period of time, the caller's service provider network 1070 may determine whether the call was connected, determination 205. If the call was connected (i.e., determination 205=Yes), the call will continue, step 550.

However, if after the predetermined period of time the caller's service provider network 1070 determines that the call has not been connected (i.e., determination 205=No), the caller's service provider communication network 1070 may prepare a data communication call message to a VSIM server 1030 indicating the entered unique identifier (i.e., desired MIN), step 211. The data communication call may further indicate the unique identifier of the caller's communication device 1010. This data communication call may be transmitted to the VSIM server 1030, step 212. Once the data communication call is transmitted, the caller's communication network 1070 may await a response from the VSIM server 1030. As described above with reference to FIG. 2, the VSIM server 1030 may retrieve the user's VSIM account from the VSIM database 1035 using the information contained in the data communication call (see steps 310-330). While the VSIM server 1030 performs the various steps in response to the received data communication call, the caller's communication network 1070 may await a response from the VSIM server 1030, step 213.

While awaiting a response, the caller's communication network 1070 may periodically determine whether a predetermined time for response from the VSIM server 1030 has expired, determination 214. Limiting the period of waiting for a response ensures that the caller's communication network 1070 does not wait indefinitely since the VSIM server 1030 could be down or otherwise unable to respond in a timely manner (e.g., due to caller load capacity issues). A variety of situations may prevent the VSIM server from providing a timely response to the caller's communication network 1070. For example, the communication link between the communication network 1070 and VSIM server 1030 may unexpectedly terminate. In any case, if a response is not received from the VSIM server 1030 within the predetermined period of time (i.e., determination 214=Yes), the caller's communication network 1070 may end the call attempt, step 215. If, however, the predetermined period of time has not expired (i.e., determination 214=No), the caller's communication network 1070 may continue to await a response from the VSIM server 1030, step 213.

If the caller's communication network 1070 receives an indication from the VSIM server 1030 that the VSIM subscription associated with the entered unique identifier is not a VSIM type subscription (i.e., determination 220=No), the caller's communication network 1070 may end the call attempt, step 215, and optionally indicate to the caller that the call attempt has failed, step 216.

If the caller's communication network 1070 receives an indication that the entered unique identifier is associated with a VSIM type subscription (i.e., determination 220=Yes) the caller's service provider network 1070 must await a response as to whether a communication link with the user's mobile device 1050 is possible. In addition, the caller's service provider network 1070 may await a response as to whether the VSIM subscription associated with the unique identifier is in monitor mode or not.

If the desired VSIM subscription is determined by the VSIM server 1030 to not be in monitor mode (see step 320, FIG. 2) (i.e., determination 218=No), the caller's communication network 1070 may receive an indication of that status, step 225, and in response end the call attempt, step 215. The caller's communication network 1070 may optionally generate and transmit a message to the caller indicating that the desired VSIM subscription is not in monitor mode. If the called VSIM subscription is determined by the VSIM server to be in monitor mode (see step 320, FIG. 2) (i.e., determination 218=Yes), the caller's communication network 1070 may receive an indication from the VSIM server 1030 that a call-pending alert has been sent to the user's mobile device 1050 and may relay that information to the caller's communication device, step 230 (see also FIG. 2). In optional embodiments in which an indication of the sent alert is not generated and sent (see FIG. 2, optional steps 230, 130) the predetermined period of time for awaiting a response from the VSIM server may time out so the caller's communication network 1070 may end the call attempt, determination 214 and step 215. As described above, the caller's communication network 1070 may optionally transmit a message to the caller's communication device indicating that the call attempt has failed, step 216.

Figure 6:
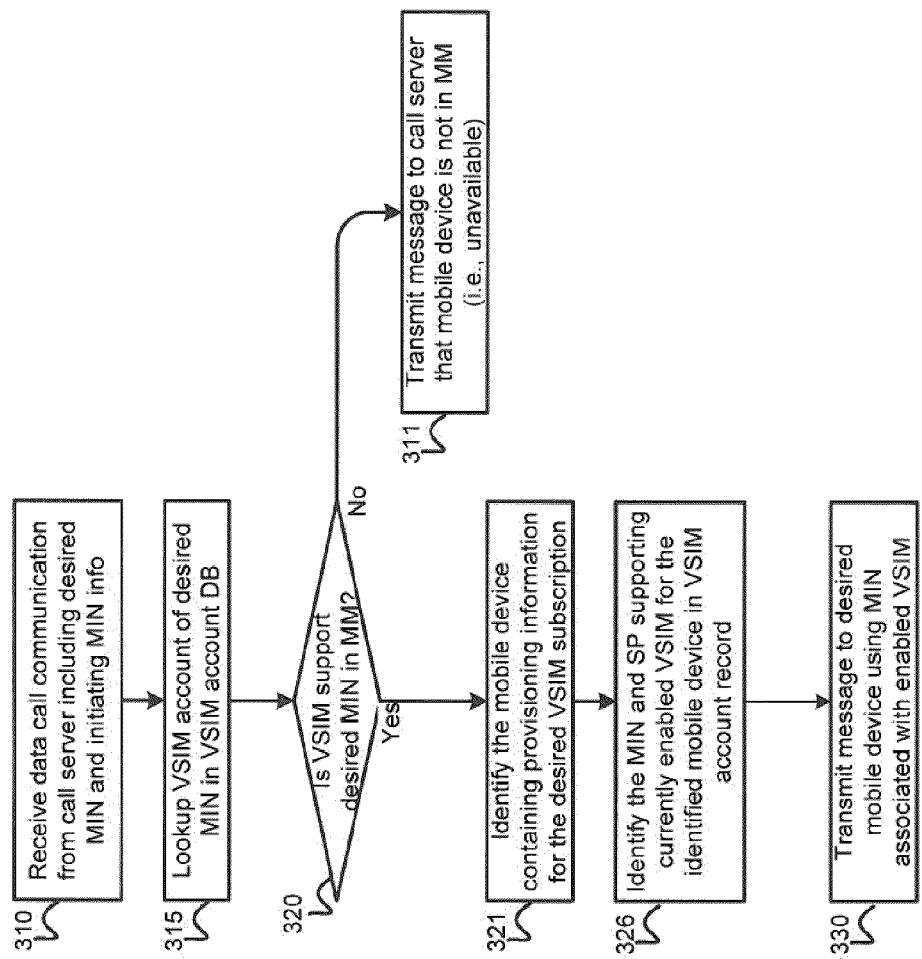
FIG. 6 is a process flow diagram of an embodiment method for handling a call attempt by the VSIM server to a user's mobile device.

FIG. 6 is a process flow diagram of an embodiment method within the VSIM server for handling a call attempt to a user's mobile device. When the caller's communication network has determined that a call has not been connected (i.e., determination 205 in FIGS. 2 and 5=No), the caller's communication network 1070 may prepare and sends a data communication call to the VSIM server 1030 with information such as the desired unique identifier and the unique identifier of the caller's communication device 1010. The VSIM server 1030 receives the data call communication, step 310. Using the entered unique identifier contained in the received data call communication as a look up value, the VSIM server 1030 may retrieve the user's VSIM account from the server's local memory or an associated VSIM server data base 1035, step 315. Accessing the information within the retrieved VSIM account, the VSIM server 1030 may determine whether the desired VSIM subscription is in monitor mode, determination 320. If the desired VSIM subscription is not in monitor mode (i.e., determination 320=No), then the VSIM server 1030 may generate and transmit a message to the caller's communication network 1070 indicating such status and to terminate the call attempt, step 311.

One advantage of implementing VSIM subscriptions is the ability to upload the provisioning information associated with a VSIM subscription back to the VSIM server 1030 and then subsequently download the provisioning information into any communication device that supports VSIM subscriptions. For example, users may rent communication devices while traveling abroad and download some or all of their VSIM subscriptions into the rented communication device. While some of their VSIM subscriptions are downloaded into a rented communication device, other VSIM subscription may be still downloaded to a user's personal communication device. Accordingly, in some instances it may be necessary to also determine the identity of the communication device to which the VSIM subscription is downloaded. For example, a record of the communication device's Electronic Serial Number (ESN) or International Mobile Equipment Identity (IMEI) may be recorded in the VSIM account each time the VSIM subscription information is downloaded to the communication device. This information may be contained in the VSIM account stored by the VSIM server 1030. Thus, if the desired VSIM subscription is determined to be in monitor mode (i.e., determination 320=Yes), then the VSIM server 1030 may first determine the identity of the communication device to which the VSIM subscription associated with the desired MIN, step 321. The VSIM server 1030 may then determine the unique identifier associated with the currently enabled VSIM subscription for the identified communication device, step 326. Alternatively, in embodiments where all of the user's VSIM subscriptions are downloaded to a single communication device the step of identifying the mobile device may be omitted. In both embodiments, using the unique identifier associated with the currently enabled VSIM subscription, the VSIM server 1030 may generate and transmit an alert to the user's mobile device 1050 indicating the receipt of a call attempt to a disabled VSIM subscription, step 330.

In this manner, various communication network elements are coordinated and utilized to provide an alert to a user's mobile device 1050 indicating the receipt of a call attempt to the desired VSIM subscription. Upon receipt of the alert, the user may initiate a call to the caller using the information contained in the alert via the currently enabled VSIM subscription. Alternatively, the user may elect to switch VSIM subscriptions as described above with reference to FIG. 4 so that the VSIM subscription over which the call attempt was made is enabled in case the caller calls back.

Figure 7A:
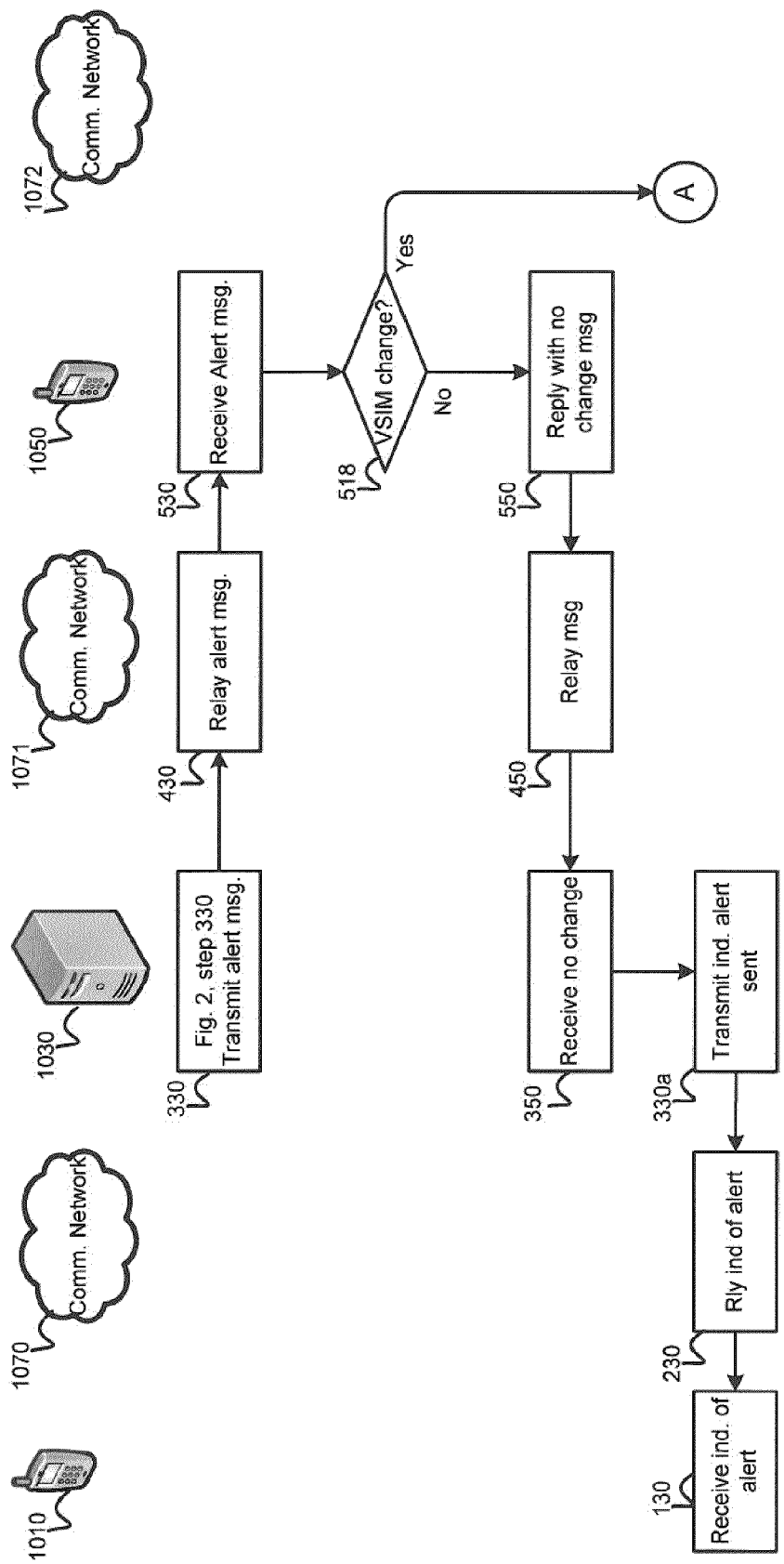
FIG. 7A is a process flow diagram of an embodiment method for providing an alert to a user's mobile device that a call attempt has been received to a currently disabled VSIM service provider subscription and permitting the user to switch currently enabled VSIM service provider subscriptions.
Figure 7B:
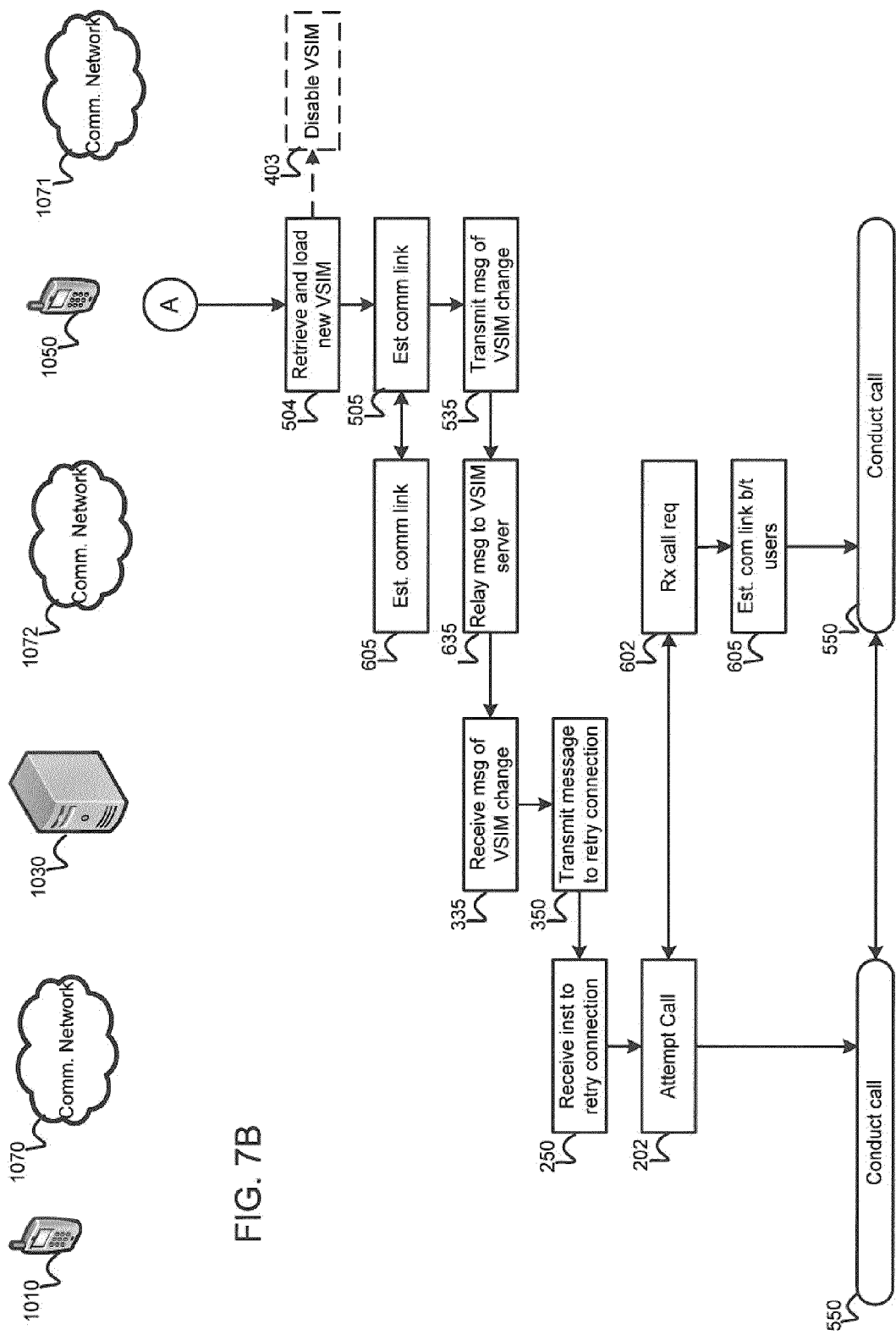
FIG. 7B is a process flow diagram of an embodiment method for providing an alert to a user's mobile device that a call attempt has been received to a currently disabled VSIM service provider subscription and permitting the user to switch currently enabled VSIM service provider subscriptions.

In an alternative embodiment, upon receipt of a incoming call alert (see FIGS. 2 and 7*a*, step 530) the mobile device 1050 may present a display giving the user the option of switching VSIM subscriptions so as to immediately enable the VSIM subscription associated with the entered unique identifier (i.e., the called number). If the user elects to switch VSIM subscriptions, the incoming call attempt may be completed as soon as the VSIM subscription switch is effectuated. FIGS. 7*a* and 7*b* depict a process flow diagram of an embodiment method for providing an alert to a user's mobile device that a call attempt has been received to a disabled VSIM subscription and providing a user an option to VSIM subscriptions. The process flow of FIGS. 7*a* and 7*b* may be performed in addition to the process flow depicted in FIG. 2. As described above with reference to FIG. 2, an alert regarding an incoming call attempt may be sent to the mobile device 1050, see FIG. 7A and FIG. 2, steps 330, 430 and 530. In response, the mobile device 1050 may present a prompt to the user inquiring whether the user desires to switch VSIM subscriptions to enable the VSIM subscription of the incoming call. If the user responds to the prompt by indicating that the VSIM subscription should not be switched (i.e., determination 518=No), the mobile device 1050 may, optionally, generate a reply to the VSIM server 1030 indicting the user's determination, step 550. The generated message may be transmitted and relayed through the communication network 1071 associated with the currently enabled VSIM subscription, step 450, and received by the VSIM server 1030, step 350. Upon receipt, the VSIM server 1030 may generate and transmit an indication back to the caller informing the caller's communication network that the user's communication device using the unique identifier associated with the currently disabled VSIM subscription is not available and caller's communication network need not continue to establish a communication link with the user's communication device 1050, step 330*a*. This indication may be relayed via the caller's service provider communication network 1070 and received by the caller's communication device 1010, steps 230 and 130, similar to the optional steps described above with reference to FIG. 2.

However, if in response to the alert and inquiry prompt the user of the mobile device 1050 elects to switch VSIM subscriptions (i.e., determination 518=Yes), the mobile device 1050 processor may retrieve and load the provisioning data for the VSIM subscription associated with the entered unique identifier into the active VSIM memory buffer, step 504 (FIG. 7*b*) (see also FIG. 4, steps 501-535). As described in more detail above with reference to FIG. 4, the mobile device 1050 processor may optionally inform the service provider network 1071 associated with the disabled (previously enabled) VSIM subscription that the mobile device 1050 is disabling the subscription, step 403. With the new provisioning data loaded into the active VSIM memory buffer, the mobile device 1050 processor establish a communication link with the communication network 1072 associated with the newly enabled VSIM subscription and logs into the network so that it may send and receive calls, steps 505 and 605 (see also FIG. 4, step 505, 605). Once the communication link has been established a status report indicating the switch of currently enabled VSIM subscriptions may be generated and transmitted to the VSIM server 1030, steps 535, 635, 335, see also FIG. 4. Upon receipt of the status report, step 335, the VSIM server 1030 may generate and transmit a message to the caller's service provider network 1070 to inform the caller's communication network 1070 that it may replace the call to the user's mobile device 1050 using the entered unique identifier, step 350. The caller's service provider network 1070 receives this message from the VSIM server 1030, step 250, and may re-attempt to establish an end-to-end communication link with the user's mobile device 1050, step 202. With the mobile device logged into the desired service provider network, the call request will proceed in the conventional manner to establish an end-to-end communication link between the caller and the user's mobile device, steps 602, 605. Once the communication link is established, the call may be conducted, step 550.

Figure 8:
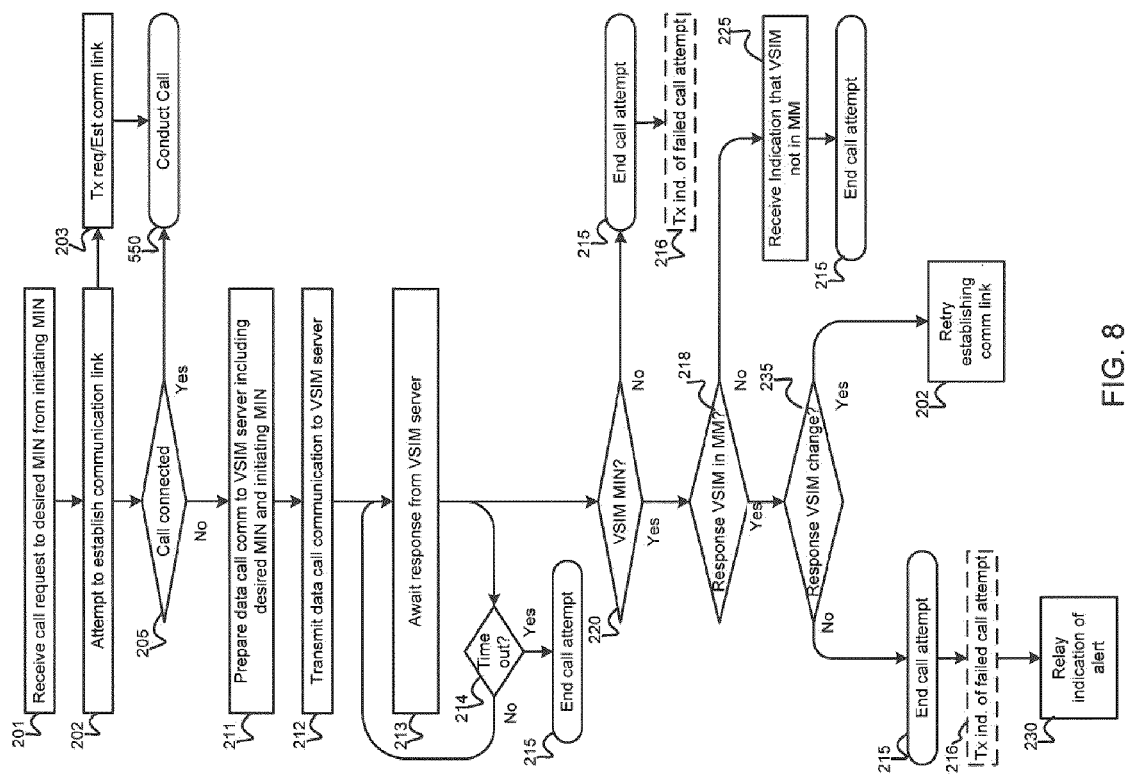
FIG. 8 is a process flow diagram of an embodiment method for handling a call attempt by a caller's gateway server to a user's mobile device when the user elects to switch currently enabled VSIM service provider subscriptions in order to complete the call attempt.

FIG. 8 is a process flow diagram of an embodiment method that may be implemented in the caller's service provider communication network 1070 for handling a call to a user's mobile device 1050 when the user switches VSIM subscriptions in order to receive the call. The process flow of FIG. 8 is similar to the process flow described above with reference to FIG. 5. However, if the caller's communication network 1070 receives an indication that the desired VSIM subscription is in monitor mode (i.e., determination 218=Yes), the caller's communication network 1070 awaits a further indication from the VSIM server 1030 as to whether the user has switched VSIM subscriptions, determination 235. If the caller's communication network 1070 receives an indication that the user has elected to not switch currently enabled VSIM subscriptions (i.e., determination 235=No), the caller's communication network 1070 may end the call attempt, step 215, and optionally indicate to the caller that the call attempt has failed, step 216. The caller's communication network 1070 may also await an indication that a call-pending alert was sent to the user's mobile device and relay that information to the caller's communication device similar to step 230 of FIG. 5. If the caller's communication network 1070 receives an indication that the user has switched VSIM subscriptions (i.e., determination 235=Yes), the communication network 1070 may re-attempt establishing a communication link with the user's mobile device 1050, step 202 (see also FIG. 7b, step 202).

Figure 9:
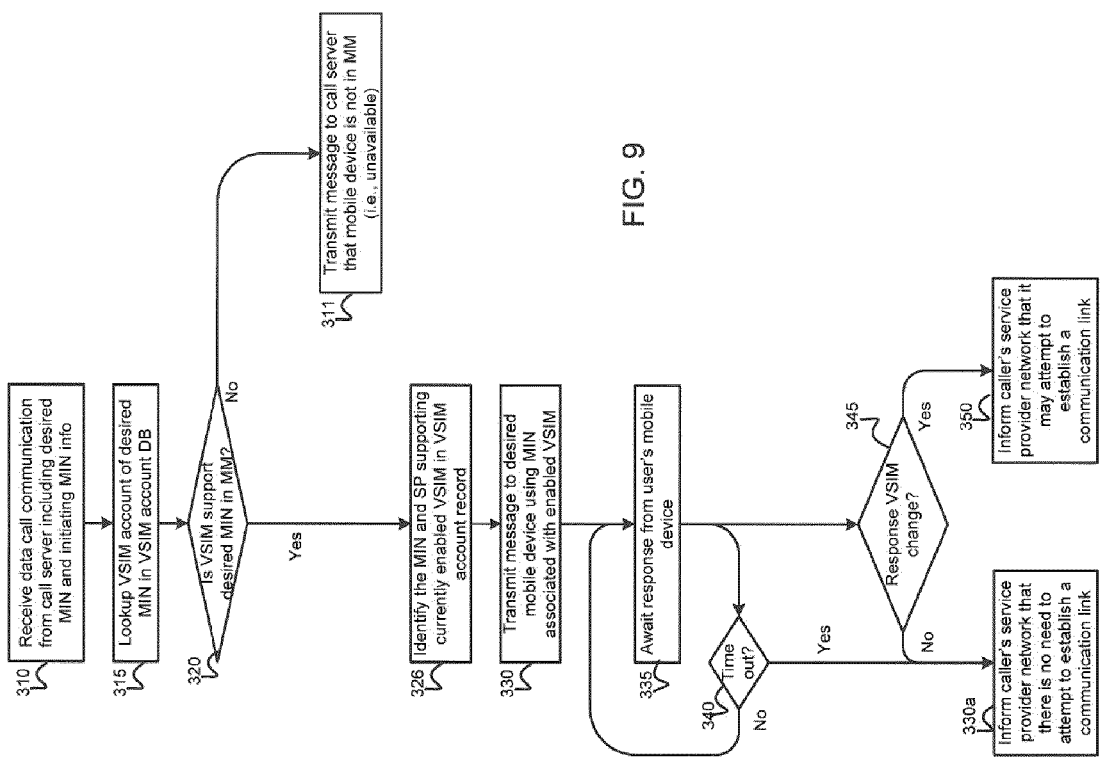
FIG. 9 is a process flow diagram of an embodiment method for handling a call attempt by a VSIM server to a user's mobile device when the user elects to switch currently enabled VSIM service provider subscriptions in order to complete the call attempt.

FIG. 9 is a process flow diagram of an embodiment method that may be implemented in the VSIM server 1030 for handling a call to a user's mobile device 1050 when the user elects to switch VSIM subscriptions in order to accept the call. The process flow of FIG. 9 is similar to the process flow described above with reference to FIG. 5. However, after transmitting an alert message to the user's mobile device 1050 via the currently enabled VSIM subscription, step 330, the VSIM server 1030 may await a response from the user's mobile device 1050 indicating whether the user has switched enabled VSIM subscriptions, step 335. As the VSIM server 1030 awaits a response, it may periodically determine whether a predetermined time for response has expired, determination 340, since the VSIM server 1030 should not await indefinitely for a response from the user's mobile device 1050. A variety of reasons may prevent the user's mobile device 1050 from timely providing a response to the VSIM server 1030. For example, the communication link between the user's mobile device 1050 and VSIM server 1030 may unexpectedly terminate. Alternatively, the user may simply not respond to the request to switch VSIM subscriptions. If the prescribed period of time has not expired (i.e., determination 340=No), then the VSIM server 1030 may continue waiting for a response from the user's mobile device 1050, step 335. If a response is not received from the user's mobile device 1050 within a predetermined period of time (i.e., determination 340=Yes), the VSIM server 1030 may transmit to the caller's communication device 1010 the indication of an alert sent to the user's mobile device 1050 of the call attempt, step 330a. Alternatively, the VSIM server 1030 may simply terminate the process flow as an alert has already been sent to the user's mobile device 1050.

The VSIM server 1030 may receive a response from the user's mobile device 1050 indicating that the user has switched enabled VSIM subscriptions or that the user has declined to make such a switch. In an embodiment, other responses may also be transmitted, such as an indication of time at which the user plans to switch VSIM subscriptions, which could be communicated back to the caller so the caller can call back at a time when the user will be available. If a response received from the mobile device 1050 indicates that the user elected not to switch VSIM subscriptions (i.e., determination 345=No), the VSIM server 1030 may transmit a message to the caller's service provider network server 1030 that the user's mobile device is unavailable, step 330a. If the response received from the mobile device 1050 indicates that the user has switched enabled VSIM subscriptions (i.e., determination 345=Yes), the VSIM server 1030 may transmit a message to the caller's communication network 1070 informing it that it may now establish a communication link between the caller's communication device 1010 and the user's mobile device 1050, step 350.

In order to allow the user to switch currently enabled VSIM subscriptions, the caller may have to endure a slight delay while the user is alerted to the call attempt and performs the steps necessary to switch enabled VSIM subscriptions. However, by implementing the process flows of FIGS. 7a, 7b, 8, and 9, the caller may be able to contact the user even when the user was logged into a different service provider network at the time of the call.

Figure 10:
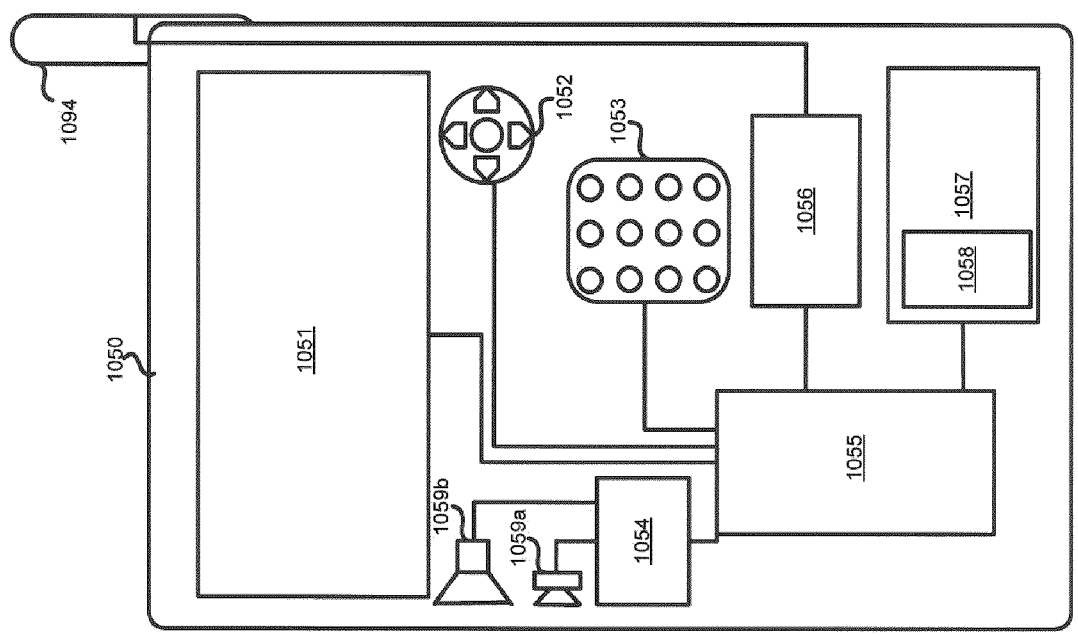
FIG. 10 is a component block diagram of a mobile device suitable for use with the various embodiments.

FIG. 10 depicts typical components of a mobile device 1050 suitable for use with the various embodiments. A typical mobile device 1050 includes a processor 1055 coupled to internal memory 1057 and a user interface display 1051. The internal memory 1057 includes a VSIM memory unit 1058 which is used to store the provisioning information of an enabled VSIM subscription. The VSIM memory unit 1058 may be a partition within the mobile device internal memory 1057 or may be a separate internal memory unit (i.e., a separate memory chip). In addition, the VSIM memory unit 1058 may store personal data downloaded from a VSIM server 1030 for use with applications being executed on the mobile device processor 1055.

The mobile device 1050 may include an antenna 1094 for sending and receiving electromagnetic radiation that is connected to a wireless data link and/or cellular telephone transceiver 1056 coupled to the processor 1055. In some implementations, the transceiver 1056 and portions of the processor 1055 and memory 1057 used for cellular telephone communications are referred to as the air interface since the combination provides a data interface via a wireless data link. Further, the mobile device 1050 typically includes a speaker 1059b to produce audible sound and a microphone 1059a for sensing sound, such as receiving the speech of a user. Both the microphone 1059a and speaker 1059b may be connected to the processor 1055 via a vocoder 1054 which transforms analog electrical signals received from the microphone 1059a into digital codes, and transform digital codes received from the processor 1055 into analog electrical signals which the speaker 1059b can transform into sound waves. In some implementations, the vocoder 1054 may be included as part of the circuitry and programming of the processor 1055.

The processor 1055 may be any programmable microprocessor, microcomputer or multiple processor chip or chips that can be configured by software instructions (applications) to perform a variety of functions, including the functions of the various embodiments described below. In some mobile devices, multiple processors 1055 may be provided, such as one processor dedicated to wireless communication functions and one processor dedicated to running other applications. Typically, software applications may be stored in the internal memory 1057 before they are accessed and loaded into the processor 1055. In some mobile devices, the processor 1055 may include internal memory sufficient to store the application software instructions. For the purposes of this description, the term memory generally refers to all memory accessible by the processor 1055, including the internal memory 1057, the VSIM memory unit 1058 and memory within the processor 1055 itself. The internal memory 1057 and the VSIM memory unit 1058 may be volatile or nonvolatile memory, such as flash memory, or a mixture of both. In a preferred embodiment, the VSIM memory unit 1058 is nonvolatile memory in order to retain the service contract provisioning data when the mobile device is turned off. Mobile devices also typically include a key pad 1053 and menu selection buttons or rocker switches 1052 for receiving user inputs.

Figure 11:
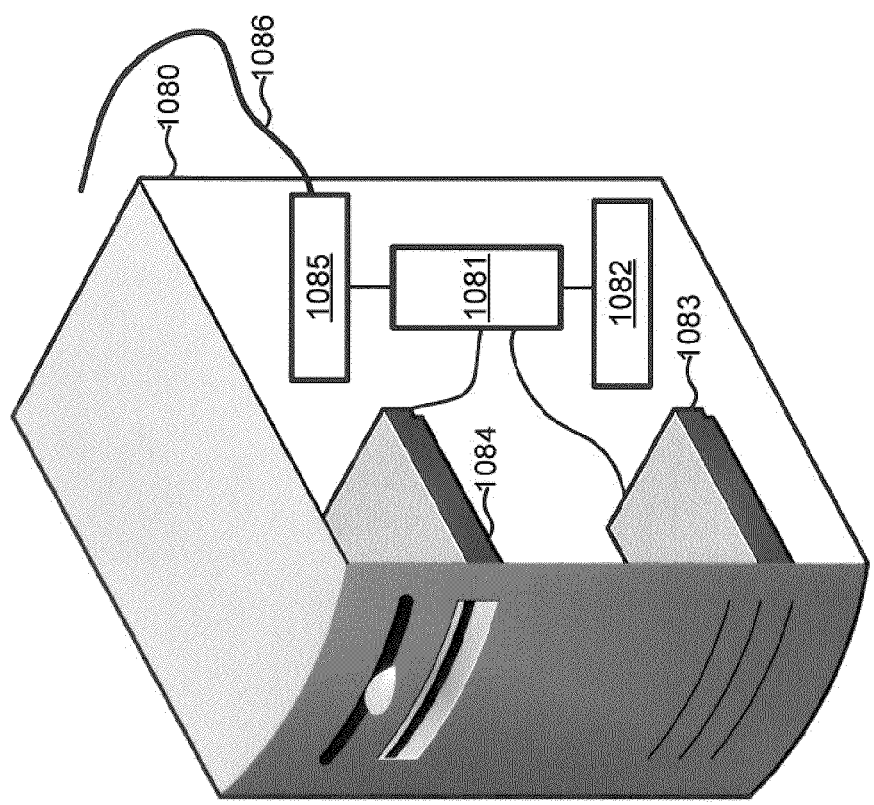
FIG. 11 is a component block diagram of an example server suitable for use with the various embodiments.

A number of the embodiments described above discuss a variety of servers including the VSIM server 1030 as well as a number of servers incorporated within each of communication networks 1070, 1071, 1072 which assist in the routing of calls to and from communication devices 1010 and mobile devices 1050. FIG. 11 depicts typical components of a server 1080 suitable for use as any of the above identified servers. Such a remote server 1080 typically includes a processor 1081 coupled to volatile memory 1082 and a large capacity nonvolatile memory, such as a disk drive 1083. The server 1080 may also include a floppy disc drive and/or a compact disc (CD) drive 1084 coupled to the processor 1081. The server 1080 may also include a number of connector ports coupled to the processor 1081 for establishing data connections or receiving external memory devices, such as Ethernet, USB or FireWire® connector sockets or other network connection circuits 1085 for coupling the processor 1081 to a network 1086 such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation determinations should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method for alerting a user of call attempts to a mobile device via a currently disabled service provider subscription, comprising:

receiving data from a service provider network regarding an attempted call to the mobile device, the received data including a unique identifier associated with the currently disabled VSIM subscription;

retrieving from a database a VSIM account associated with the mobile device using the unique identifier;

determining a status of VSIM subscriptions enabled on the mobile device from the retrieved VSIM account;

identifying a currently enabled VSIM subscription from the retrieved VSIM account;

identifying a unique identifier associated with the currently enabled VSIM subscription; and transmitting an alert to the mobile device using the unique identifier associated with the currently enabled VSIM subscription, the alert indicating receipt of a call attempt to the mobile device on the currently disabled VSIM subscription.

2. The method of claim 1, further comprising:
determining whether the currently disabled VSIM subscription is in monitor mode,
wherein identifying the unique identifier associated with the currently enabled VSIM subscription and transmitting the alert are performed when the currently disabled VSIM subscription is determined to be in monitor mode.

3. The method of claim 1, further comprising:
receiving an indication from the mobile device that the enabled VSIM subscription has been switched; and
informing the service provider network that the mobile device is available.

4. The method of claim 1, further comprising:
receiving an indication from the mobile device indicating that the enabled VSIM subscription will not be switched; and
informing the service provider network that the mobile device is not available.

5. The method of claim 3, further comprising:
receiving a status report of a VSIM subscription enabled on the mobile device from the mobile device, the status report identifying disabled VSIM subscriptions that should be in monitoring mode; and
updating the retrieved VSIM account based on the received status report.

6. A method for attempting a call to a mobile device having a plurality of VSIM subscriptions, comprising:
receiving a call request including a unique identifier associated with at least one of the plurality of VSIM subscriptions;
attempting to establish a communication link with the called mobile device using the unique identifier;
determining whether the communication link is successfully established;
transmitting data to a remote server including the unique identifier if the communication link is not successfully established;
receiving a response from the remote server indicating whether the at least one of the plurality of VSIM subscriptions associated with the unique identifier is in monitor mode; and
relaying an indication to a caller's communication device that a call attempt alert was sent to the mobile device.

7. The method of claim 6, wherein the call request is received from a caller's communication network.

8. The method of claim 6, wherein the call request is received from the caller's communication device.

9. The method of claim 6, further comprising:
receiving a response from the remote server indicating that the mobile device is available; and
re-attempting to establish a communication link with the mobile device using the unique identifier.

10. A method of receiving an alert on a mobile device configured to enable one of a plurality of VSIM subscriptions, comprising:
enabling one of the plurality of VSIM subscriptions;
determining which currently disabled VSIM subscriptions should be in placed into a monitor mode; and
transmitting to a remote server a status report of a currently enabled VSIM subscription and disabled VSIM subscriptions that should be in monitoring mode;
receiving the alert indicating that a call attempt to the mobile device via a disabled VSIM subscription was received; and
processing information contained in the alert
determining whether to change the enabled VSIM subscription to that corresponding to the call attempt;
enabling the VSIM subscription to that corresponding to the call attempt; and
informing the remote server that the VSIM subscription corresponding to the call attempt has been enabled.

11. The method of claim 10, wherein said determining which currently disabled subscription should be placed into the monitor mode comprises receiving a user's selection of which currently disabled VSIM subscriptions should be placed into the monitor mode.

12. The method of claim 10, further comprising displaying the processed information contained in the alert to a user.

13. The method of claim 10, wherein said determining whether to change the enabled VSIM subscription to that corresponding the call attempt comprises receiving an input from a user to change the enabled VSIM subscription to that corresponding to the call attempt.

14. The method of claim 10, further comprising:
transmitting a request to a communication network supporting a currently enabled VSIM subscription to disable the currently enabled VSIM subscription, wherein the request includes a request to disable a voice mail feature associated with the currently enabled VSIM subscription.

15. The method of claim 14, wherein the step of transmitting a request to the communication network supporting a currently enabled VSIM subscription to disable the currently enabled VSIM subscription is performed prior to enabling the VSIM subscription corresponding to the call attempt.

16. A method for placing a call to a mobile device configured to enable one of a plurality of VSIM subscriptions, comprising:
receiving a call request including a unique identifier associated with at least one of the plurality of VSIM subscriptions;
attempting to establish a communication link with the called mobile device using the unique identifier;
determining whether the communication link is successfully established;
transmitting data to a remote server including the unique identifier if the communication link is not successfully established;
receiving in the remote server the transmitted data from a service provider network;
retrieving from a database a VSIM account associated with the mobile device using the unique identifier;
determining a status of VSIM subscriptions enabled on the mobile device from the retrieved VSIM account;
identifying a currently enabled VSIM subscription from the retrieved VSIM account;
identifying a unique identifier associated with the currently enabled VSIM subscription; and
transmitting an alert to the mobile device using the unique identifier associated with the currently enabled VSIM subscription, the alert indicating receipt of a call attempt to the mobile device using the unique identifier associated with the currently disabled VSIM subscription.

17. The method of claim 16, wherein the call request is received from a caller's communication network.

18. The method of claim 16, wherein the call request is received from a caller's communication device.

19. The method of claim 16, further comprising:
determining whether the currently disabled VSIM subscription is in monitor mode,
wherein identifying the unique identifier associated with the currently enabled VSIM subscription and transmitting the alert are performed when the currently disabled VSIM subscription is determined to be in monitor mode.

20. The method of claim 16, further comprising:
receiving an indication from the mobile device that the enabled VSIM subscription has been switched; and
informing the service provider network that the mobile device is available.

21. The method of claim 16, further comprising:
receiving an indication from the mobile device indicating that the enabled VSIM subscription will not be switched; and
informing the service provider network that the mobile device is not available.

22. The method of claim 18, further comprising:
receiving a status report of a VSIM subscription enabled on the mobile device from the mobile device, the status report identifying disabled VSIM subscriptions that should be in monitoring mode; and
updating the retrieved VSIM account based on in the received status report.

23. A remote server, comprising:
means for receiving data from a service provider network regarding an attempted call to the mobile device, the received data including a unique identifier associated with the currently disabled VSIM subscription;
means for retrieving from a database a VSIM account associated with the mobile device using the unique identifier;
means for determining a status of VSIM subscriptions enabled on the mobile device from the retrieved VSIM account;
means for identifying a currently enabled VSIM subscription from the retrieved VSIM account;
means for identifying a unique identifier associated with the currently enabled VSIM subscription; and
means for transmitting an alert to the mobile device using the unique identifier associated with the currently enabled VSIM subscription, the alert indicating receipt of a call attempt to the mobile device on the currently disabled VSIM subscription.

24. The remote server of claim 23, further comprising:
means for determining whether the currently disabled VSIM subscription is in monitor mode,
wherein means for identifying the unique identifier associated with the currently enabled VSIM subscription and means for transmitting the alert identify the unique identifier associated with the currently enabled VSIM subscription and transmit the alert when the currently disabled VSIM subscription is determined to be in monitor mode.

25. The remote server of claim 23, further comprising:
means for receiving an indication from the mobile device that the enabled VSIM subscription has been switched; and
means for informing the service provider network that the mobile device is available.

26. The remote server of claim 23, further comprising:
means for receiving an indication from the mobile device indicating that the enabled VSIM subscription will not be switched; and
means for informing the service provider network that the mobile device is not available.

27. The remote server of claim 25, further comprising:
means for receiving a status report of a VSIM subscription enabled on the mobile device from the mobile device, the status report identifying disabled VSIM subscriptions that should be in monitoring mode; and
means for updating the retrieved VSIM account based on the received status report.

28. A communication network, comprising:
means for receiving a call request including a unique identifier associated with at least one of the plurality of VSIM subscriptions;
means for attempting to establish a communication link with the called mobile device using the unique identifier;
means for determining whether the communication link is successfully established; and
means for transmitting data to a remote server including the unique identifier if the communication link is not successfully established;
means for receiving a response from the remote server indicating whether the at least one of the plurality of VSIM subscriptions associated with the unique identifier is in monitor mode; and
means for relaying an indication to a caller's communication device that a call attempt alert was sent to the mobile device.

29. The communication network of claim 28, wherein the means for receiving the call request receives the call request from a caller's communication network.

30. The communication network of claim 28, wherein the means for receiving the call request receives the call request from the caller's communication device.

31. The communication network of claim 28, further comprising:
means for receiving a response from the remote server indicating that the mobile device is available; and
means for re-attempting to establish a communication link with the mobile device using the unique identifier.

32. A mobile device configured to enable one of a plurality of VSIM subscriptions, comprising:
means for enabling one of the plurality of VSIM subscriptions;
means for determining which currently disabled VSIM subscriptions should be in placed into a monitor mode;
means for transmitting to a remote server a status report of a currently enabled VSIM subscription and disabled VSIM subscriptions that should be in monitoring mode;
means for receiving an alert indicating that a call attempt to the mobile device via a disabled VSIM subscription was received; and
means for processing information contained in the alert;
means for determining whether to change the enabled VSIM subscription to that corresponding to the call attempt;
means for enabling the VSIM subscription to that corresponding to the call attempt; and
means for informing the remote server that the VSIM subscription corresponding to the call attempt has been enabled.

33. The mobile device of claim 32, wherein said means for determining which currently disabled subscription should be placed into the monitor mode further comprises means for receiving a user's selection of which currently disabled VSIM subscriptions should be placed into the monitor mode.

34. The mobile device of claim 32, further comprising displaying the processed information contained in the alert to a user.

35. The mobile device of claim 32, wherein said means for determining whether to change the enabled VSIM subscription to that corresponding the call attempt further comprises means for receiving an input from a user to change the enabled VSIM subscription to that corresponding to the call attempt.

36. The mobile device of claim 32, further comprising:
means for transmitting a request to a communication network supporting a currently enabled VSIM subscription to disable the currently enabled VSIM subscription, wherein the request includes a request to disable a voice mail feature associated with the currently enabled VSIM subscription.

37. The mobile device of claim 32, wherein the means for transmitting a request to the communication network supporting a currently enabled VSIM subscription to disable the currently enabled VSIM subscription transmits the request prior to enabling the VSIM subscription corresponding to the call attempt.

38. A communication system, comprising:
means for receiving a call request to a mobile device configured to enable one of a plurality of VSIM subscriptions from a communication device including a unique identifier associated with at least one of the plurality of VSIM subscriptions;
means for attempting to establish a communication link with the called mobile device using the unique identifier;
means for determining whether the communication link is successfully established;
means for transmitting data to a remote server including the unique identifier if the communication link is not successfully established;
means for receiving in the remote server the transmitted data from a service provider network;
means for retrieving from a database a VSIM account associated with the mobile device using the unique identifier;
means for determining a status of VSIM subscriptions enabled on the mobile device from the retrieved VSIM account;
means for identifying a currently enabled VSIM subscription from the retrieved VSIM account;
means for identifying a unique identifier associated with the currently enabled VSIM subscription; and
means for transmitting an alert to the mobile device using the unique identifier associated with the currently enabled VSIM subscription, the alert indicating receipt of a call attempt to the mobile device using the unique identifier associated with the currently disabled VSIM subscription.

39. The communication system of claim 38, wherein the means for receiving the call request receives the call request from a caller's communication network.

40. The communication system of claim 38, wherein the means for receiving the call request receives the call request from a caller's communication device.

41. The communication system of claim 38, further comprising:
means for determining whether the currently disabled VSIM subscription is in monitor mode,
wherein the means for identifying the unique identifier associated with the currently enabled VSIM subscription and means for transmitting the alert identify the unique identifier associated with the currently enabled VSIM subscription and transmit the alert when the currently disabled VSIM subscription is determined to be in monitor mode.

42. The communication system of claim 38 further comprising:
means for receiving an indication from the mobile device that the enabled VSIM subscription has been switched; and
means for informing the communication device that the mobile device is available.

43. The communication system of claim 38 further comprising:
means for receiving an indication from the mobile device indicating that the enabled VSIM subscription will not be switched; and
means for informing the communication device that the mobile device is not available.

44. The communication system of claim 42, further comprising:
means for receiving a status report of a VSIM subscription enabled on the mobile device from the mobile device, the status report identifying disabled VSIM subscriptions that should be in monitoring mode; and
means for updating the retrieved VSIM account based on in the received status report.

45. A remote server, comprising:
a remote server memory unit;
a remote server processing unit coupled to the remote server memory unit, wherein the remote server processor is configured with software instructions to perform steps comprising:
receiving data from a service provider network regarding an attempted call to the mobile device, the received data including a unique identifier associated with the currently disabled VSIM subscription;
retrieving from a database a VSIM account associated with the mobile device using the unique identifier;
determining a status of VSIM subscriptions enabled on the mobile device from the retrieved VSIM account;
identifying a currently enabled VSIM subscription from the retrieved VSIM account;
identifying a unique identifier associated with the currently enabled VSIM subscription; and
transmitting an alert to the mobile device using the unique identifier associated with the currently enabled VSIM subscription, the alert indicating receipt of a call attempt to the mobile device on the currently disabled VSIM subscription.

46. The remote server of claim 45, wherein the remote server processing unit is configured with software instructions to perform further steps comprising:
determining whether the currently disabled VSIM subscription is in monitor mode,
wherein identifying the unique identifier associated with the currently enabled VSIM subscription and transmitting the alert are performed when the currently disabled VSIM subscription is determined to be in monitor mode.

47. The remote server of claim 45, wherein the remote server processing unit is configured with software instructions to perform further steps comprising:
receiving an indication from the mobile device that the enabled VSIM subscription has been switched; and
informing the service provider network that the mobile device is available.

48. The remote server of claim 45, wherein the remote server processing unit is configured with software instructions to perform further steps comprising:
receiving an indication from the mobile device indicating that the enabled VSIM subscription will not be switched; and informing the service provider network that the mobile device is not available.

49. The remote server of claim 47, wherein the remote server processing unit is configured with software instructions to perform further steps comprising:
receiving a status report of a VSIM subscription enabled on the mobile device from the mobile device, the status report identifying disabled VSIM subscriptions that should be in monitoring mode; and
updating the retrieved VSIM account based on the received status report.

50. A communication network, comprising:
a call routing server memory unit;
a call routing server processing unit coupled to the call routing server memory unit, wherein the call routing server processor is configured with software instructions to perform steps comprising:
receiving a call request including a unique identifier associated with at least one of the plurality of VSIM subscriptions;
attempting to establish a communication link with the called mobile device using the unique identifier;
determining whether the communication link is successfully established;
transmitting data to a remote server including the unique identifier if the communication link is not successfully established;
receiving a response from the remote server indicating whether the at least one of the plurality of VSIM subscriptions associated with the unique identifier is in monitor mode; and
relaying an indication to the communication device that a call attempt alert was sent to the mobile device.

51. The communication network of claim 50, wherein the call routing server processing unit is configured with software instructions to perform further steps comprising:
receiving the call request from a caller's communication network.

52. The communication network of claim 50, wherein the call routing server processing unit is configured with software instructions to perform further steps comprising:
receiving the call request from the caller's communication device.

53. The communication network of claim 50, wherein the call routing server processing unit is configured with software instructions to perform further steps comprising:
receiving a response from the remote server indicating that the mobile device is available; and
re-attempting to establish a communication link with the mobile device using the unique identifier.

54. A mobile device comprising:
a mobile device processor; and
a mobile device internal memory unit coupled to the mobile device processor, the mobile device internal memory unit including a VSIM provisioning data buffer and having stored thereon provisioning data for a plurality of VSIM subscriptions within a VSIM memory unit; and
wherein the mobile device processor is configured with software instructions to perform steps comprising:
enabling one of the plurality of VSIM subscriptions;
determining which currently disabled VSIM subscriptions should be placed in monitor mode;
transmitting to a remote server a status report of a currently enabled VSIM subscription and disabled VSIM subscriptions that should be placed in monitor mode;
receiving an alert indicating that a call attempt to the mobile device via a disabled VSIM subscription was received;
processing information contained in the alert;
determining whether to change the enabled VSIM subscription to that corresponding to the call attempt;
enabling the VSIM subscription to that corresponding to the call attempt; and
informing the remote server that the VSIM subscription corresponding to the call attempt has been enabled.

55. The mobile device of claim 54, wherein the mobile device processor is further configured with software instructions to perform steps further comprising receiving a user's selection of which currently disabled VSIM subscriptions should be placed into the monitor mode such that determining which currently disabled subscription should be placed into the monitor mode is based upon the received user's selection.

56. The mobile device of claim 54, wherein the mobile device processor is further configured with software instructions to perform steps further comprising:
displaying the processed information contained in the alert to a user.

57. The mobile device of claim 54, wherein the mobile device processor is further configured with software instructions to perform steps further comprising:
receiving an input from a user to change the enabled VSIM subscription to that corresponding to the call attempt such that determining whether to change the enabled VSIM subscription is based upon the received input from the user.

58. The mobile device of claim 54, wherein the mobile device processor is further configured with software instructions to perform steps further comprising:
transmitting a request to a communication network supporting a currently enabled VSIM subscription to disable the currently enabled VSIM subscription, wherein the request includes a request to disable a voice mail feature associated with the currently enabled VSIM subscription.

59. The mobile device of claim 58, wherein the mobile device processor is further configured with software instructions to perform steps further comprising:
transmitting a request to the communication network supporting a currently enabled VSIM subscription to disable the currently enabled VSIM subscription prior to enabling the VSIM subscription corresponding to the call attempt.

60. A tangible storage medium having stored thereon processor-executable software instructions configured to cause a processor to perform steps comprising:
receiving data from a service provider network regarding an attempted call to the mobile device, the received data including a unique identifier associated with the currently disabled VSIM subscription;
retrieving from a database a VSIM account associated with the mobile device using the unique identifier;
determining a status of VSIM subscriptions enabled on the mobile device from the retrieved VSIM account;
identifying a currently enabled VSIM subscription from the retrieved VSIM account;
identifying a unique identifier associated with the currently enabled VSIM subscription; and
transmitting an alert to the mobile device using the unique identifier associated with the currently enabled VSIM subscription, the alert indicating receipt of a call attempt to the mobile device on the currently disabled VSIM subscription.

61. The tangible storage medium of claim 60, wherein the tangible storage medium has processor-executable software instructions configured to cause a processor to perform further steps comprising:
- determining whether the currently disabled VSIM subscription is in monitor mode,
- wherein identifying the unique identifier associated with the currently enabled VSIM subscription and transmitting the alert are performed when the currently disabled VSIM subscription is determined to be in monitor mode.

62. The tangible storage medium of claim 60, wherein the tangible storage medium has processor-executable software instructions configured to cause a processor to perform further steps comprising:
- receiving an indication from the mobile device that the enabled VSIM subscription has been switched; and
- informing the service provider network that the mobile device is available.

63. The tangible storage medium of claim 60, wherein the tangible storage medium has processor-executable software instructions configured to cause a processor to perform further steps comprising:
- receiving an indication from the mobile device indicating that the enabled VSIM subscription will not be switched; and
- informing the service provider network that the mobile device is not available.

64. The tangible storage medium of claim 62, wherein the tangible storage medium has processor-executable software instructions configured to cause a processor to perform further steps comprising:
- receiving a status report of a VSIM subscription enabled on the mobile device from the mobile device, the status report identifying disabled VSIM subscriptions that should be in monitoring mode; and
- updating the retrieved VSIM account based on the received status report.

65. A tangible storage medium having stored thereon processor-executable software instructions configured to cause a processor to perform steps comprising:
- receiving a call request including a unique identifier associated with at least one of the plurality of VSIM subscriptions;
- attempting to establish a communication link with the called mobile device using the unique identifier;
- determining whether the communication link is successfully established;
- transmitting data to a remote server including the unique identifier if the communication link is not successfully established;
- receiving a response from the remote server indicating whether the at least one of the plurality of VSIM subscriptions associated with the unique identifier is in monitor mode; and
- relaying an indication to the communication device that a call attempt alert was sent to the mobile device.

66. The tangible storage medium of claim 65, wherein the tangible storage medium has processor-executable software instructions configured to cause a processor to perform further steps comprising:
- receiving the call request from a caller's communication network.

67. The tangible storage medium of claim 65, wherein the tangible storage medium has processor-executable software instructions configured to cause a processor to perform further steps comprising:
- receiving the call request from a caller's communication device.

68. The tangible storage medium of claim 65, wherein the tangible storage medium has processor-executable software instructions configured to cause a processor to perform further steps comprising:
- receiving a response from the remote server indicating that the mobile device is available; and
- re-attempting to establish a communication link with the mobile device using the unique identifier.

69. A tangible storage medium having stored thereon processor-executable software instructions configured to cause a processor to perform steps comprising:
- enabling one of the plurality of VSIM subscriptions;
- determining which currently disabled VSIM subscriptions that should be in monitor mode;
- transmitting to a remote server a status report of a currently enabled VSIM subscription and disabled VSIM subscriptions that should be in monitor mode;
- receiving the alert indicating that a call attempt to the mobile device via a disabled VSIM subscription was received; and
- processing information contained in the alert determining whether to change the enabled VSIM subscription to that corresponding to the call attempt;
- enabling the VSIM subscription to that corresponding to the call attempt; and
- informing the remote server that the VSIM subscription corresponding to the call attempt has been enabled.

70. The tangible storage medium of claim 69, wherein the tangible storage medium has processor-executable software instructions configured to cause a processor to perform further steps comprising:
- receiving a user's selection of which currently disabled VSIM subscriptions should be placed into the monitor mode such that determining which currently disabled subscription should be placed into the monitor mode is based upon the received user's selection.

71. The tangible storage medium of claim 69, wherein the tangible storage medium has processor-executable software instructions configured to cause a processor to perform further steps comprising:
- displaying the processed information contained in the alert to a user.

72. The tangible storage medium of claim 69, wherein the tangible storage medium has processor-executable software instructions configured to cause a processor to perform further steps comprising:
- receiving an input from the user to change the enabled VSIM subscription to that corresponding to the call attempt such that determining whether to change the enabled VSIM subscription is based upon the received input from the user.

73. The tangible storage medium of claim 69, wherein the tangible storage medium has processor-executable software instructions configured to cause a processor to perform further steps comprising:
- transmitting a request to a communication network supporting a currently enabled VSIM subscription to disable the currently enabled VSIM subscription, wherein the request includes a request to disable a voice mail feature associated with the currently enabled VSIM subscription.

74. The tangible storage medium of claim 73, wherein the tangible storage medium has processor-executable software instructions configured to cause a processor to perform further steps comprising:

transmitting a request to the communication network supporting a currently enabled VSIM subscription to disable the currently enabled VSIM subscription prior to enabling the VSIM subscription corresponding to the call attempt.

* * * * *